(12) United States Patent
Sun et al.

(10) Patent No.: US 12,256,416 B2
(45) Date of Patent: Mar. 18, 2025

(54) COMMUNICATION METHOD, DEVICE, AND APPARATUS

(71) Applicant: HUAWEI TECHNOLOGIES CO., LTD., Guangdong (CN)

(72) Inventors: Hao Sun, Xi'an (CN); Lixia Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 648 days.

(21) Appl. No.: 17/171,488

(22) Filed: Feb. 9, 2021

(65) Prior Publication Data

US 2021/0168809 A1   Jun. 3, 2021

Related U.S. Application Data

(63) Continuation of application No. PCT/CN2019/098723, filed on Jul. 31, 2019.

(30) Foreign Application Priority Data

Aug. 10, 2018  (CN) .......................... 201810912108.6

(51) Int. Cl.
*H04W 72/0453*    (2023.01)
*H04W 72/0446*    (2023.01)
(Continued)

(52) U.S. Cl.
CPC ....... *H04W 72/53* (2023.01); *H04W 72/0446* (2013.01); *H04W 72/0453* (2013.01); *H04W 72/23* (2023.01); *H04W 76/28* (2018.02)

(58) Field of Classification Search
CPC ............. H04W 72/53; H04W 72/0446; H04W 72/0453; H04W 72/23; H04W 76/28;
(Continued)

(56) References Cited

U.S. PATENT DOCUMENTS

2016/0270146 A1\* 9/2016 Feuersaenger ...... H04L 27/2602
2017/0289973 A1 10/2017 Yang et al.
(Continued)

FOREIGN PATENT DOCUMENTS

CN  102932882 A  2/2013
CN  103945505 A  7/2014
(Continued)

OTHER PUBLICATIONS

Sony,"PDCCH repetition for NR URLLC",3GPP TSG RAN WG1 Meeting#92bis R1-1804599,Sanya, P.R. China 16th 20th Apr. 2018,Total 6 Pages.
(Continued)

*Primary Examiner* — Ayaz R Sheikh
*Assistant Examiner* — David Zhijun Sun
(74) *Attorney, Agent, or Firm* — WOMBLE BOND DICKINSON (US) LLP

(57) ABSTRACT

A communication method, a device, and an apparatus are provided. A network device determines N configuration parameter sets configured for a terminal device Each of the N configuration parameter sets includes a parameter for detecting a candidate downlink control channel, and N is an integer greater than or equal to 2. The network device sends information about the N configuration parameter sets to the terminal device. Each of the N configuration parameter sets includes at least one of the following parameters: a bandwidth part, a search space parameter, a candidate downlink control channel detection period, a control resource set parameter, or a time domain resource set corresponding to the candidate downlink control channel. The network device may configure the N configuration parameter sets for the terminal device.

18 Claims, 5 Drawing Sheets

(51) Int. Cl.
*H04W 72/23* (2023.01)
*H04W 72/53* (2023.01)
*H04W 76/28* (2018.01)

(58) Field of Classification Search
CPC ......... H04W 52/0229; H04W 52/0212; H04W 52/0209; H04L 5/0053; H04L 5/0091; Y02D 30/70
See application file for complete search history.

(56) References Cited

U.S. PATENT DOCUMENTS

| | | |
|---|---|---|
| 2018/0192405 A1 | 7/2018 | Gong et al. |
| 2018/0227156 A1 | 8/2018 | Papasakellariou |
| 2019/0053318 A1* | 2/2019 | Nogami ................ H04W 76/27 |
| 2019/0349925 A1* | 11/2019 | Tang ................ H04W 72/0446 |
| 2020/0196282 A1* | 6/2020 | Wang ................ H04W 52/0216 |
| 2020/0280970 A1* | 9/2020 | Takeda .................. H04L 5/0053 |
| 2020/0367253 A1* | 11/2020 | Kim ...................... H04W 24/08 |
| 2021/0352501 A1* | 11/2021 | Taherzadeh Boroujeni ................ H04W 24/08 |

FOREIGN PATENT DOCUMENTS

| | | | |
|---|---|---|---|
| CN | 104219738 A | 12/2014 | |
| CN | 107222926 A * | 9/2017 | ........... H04L 5/0012 |
| CN | 108024382 A | 5/2018 | |
| CN | 108141841 A | 6/2018 | |
| CN | 108282290 A | 7/2018 | |
| CN | 108307406 A | 7/2018 | |
| CN | 108365928 A | 8/2018 | |
| EP | 3793285 A1 | 3/2021 | |
| WO | 2017065671 A1 | 4/2017 | |
| WO | WO-2018127802 A1 * | 7/2018 | ........... H04L 5/0048 |

OTHER PUBLICATIONS

Samsung,"On Search Space Design",3GPP TSG RAN WG1 Meeting 90bis R1-1717642,Prague, CZ, 9th 13th, Oct. 2017,Total 8 Pages.

* cited by examiner

COMMUNICATION METHOD, DEVICE, AND APPARATUS

CROSS-REFERENCE TO RELATED APPLICATIONS

This application is a continuation of International Application No. PCT/CN2019/098723, filed on Jul. 31, 2019, which claims priority to Chinese Patent Application No. 201810912108.6, filed on Aug. 10, 2018. The disclosures of the aforementioned applications are hereby incorporated by reference in their entireties.

TECHNICAL FIELD

The application relates to the field of communications technologies, and in particular, to a communication method, a device, and an apparatus.

BACKGROUND

In a fifth-generation mobile communications system (5G), a power saving design for a terminal device is determined as an optimization direction. At a physical layer, power consumption overheads of the terminal device are mainly caused by blind detection on a candidate physical downlink control channel (PDCCH). Simply, it may be understood that, if a base station does not send downlink control signaling to a terminal device through a PDCCH in a period of time, and the terminal device is not sure whether the base station sends the downlink control signaling, the terminal device needs to continuously perform blind detection on the PDCCH in a period of time. However, overheads caused by the blind detection become useless. If the useless overheads can be reduced while PDCCH detection performance is ensured, a longer battery life can be provided for the terminal device.

Therefore, in a long term evolution (LTE) system, a discontinuous reception (DRX) mechanism has been introduced. When the terminal device is in a connected (e.g., RRC connected) state, the terminal device uses a connected-mode DRX energy saving mechanism, that is, C-DRX (Connected-DRX). In C-DRX, the terminal device periodically performs blind detection on a candidate PDCCH, and power consumption of the terminal device is relatively high during blind detection.

SUMMARY

Embodiments of the application provide a communication method, a device, and an apparatus, to reduce power consumption of a terminal device.

According to a first aspect, a first configuration parameter set method is provided. The method includes: determining N configuration parameter sets configured for a terminal device, where each of the N configuration parameter sets includes a parameter for detecting a candidate downlink control channel, and N is an integer greater than or equal to 2; and sending information about the N configuration parameter sets to the terminal device, where each of the N configuration parameter sets includes at least one of the following parameters: a bandwidth part; a search space parameter; a candidate downlink control channel detection period; a control resource set parameter; or a time domain resource set corresponding to the candidate downlink control channel.

The method may be performed by a first communications apparatus. The first communications apparatus may be a network device or a communications apparatus that can support the network device in implementing a function required in the method. Certainly, the first communications apparatus may alternatively be another communications apparatus, for example, a chip system.

According to a second aspect, a second configuration parameter set method is provided. The method includes: receiving information about N configuration parameter sets; and determining the N configuration parameter sets based on the information about the N configuration parameter sets, where each of the N configuration parameter sets includes a parameter for detecting a candidate downlink control channel, N is an integer greater than or equal to 2, and each of the N configuration parameter sets includes at least one of the following parameters: a bandwidth part; a search space parameter; a candidate downlink control channel detection period; a control resource set parameter; or a time domain resource set corresponding to the candidate downlink control channel.

The method may be performed by a second communications apparatus. The second communications apparatus may be a terminal device or a communications apparatus that can support the terminal device in implementing a function required in the method. Certainly, the second communications apparatus may alternatively be another communications apparatus, for example, a chip system.

In an embodiment of the application, the N configuration parameter sets may be configured for the terminal device. Because values of configuration parameters included in the N configuration parameter sets are not completely the same, different possibilities are provided for correspondingly detecting power consumption of the candidate PDCCH when the terminal device uses two of the N configuration parameter sets. In this way, the terminal device switches between configuration parameter sets, so that the terminal device can be in states with different power consumption for detecting a candidate PDCCH, thereby reducing a probability that the terminal device is always in a state with highest power consumption for detecting a candidate PDCCH. In this manner, power consumption for detecting the candidate PDCCH by the terminal device can be reduced, and a service life of the terminal device can be prolonged.

For example, each of the N configuration parameter sets may include only at least one of these parameters, for example, include only a candidate downlink control channel detection period, or include only a bandwidth part. Alternatively, each of the N configuration parameter sets may include at least two of these parameters. For example, each of the N configuration parameter sets may include a search space parameter and a candidate downlink control channel detection period.

It should be noted that a parameter included in each configuration parameter set corresponds to the configuration parameter set. In addition, different configuration parameter sets may include parameters of a same type, or may include parameters of different types. This is not limited in an embodiment of the application.

In a possible design, the method further includes: when the terminal device enters, from a slot in which a candidate downlink control channel is not to be detected, a slot in which a candidate downlink control channel is to be detected, or in one or more slots in which the terminal device starts to detect the candidate downlink control channel in an $a^{th}$ discontinuous reception state cycle, sending a downlink control channel to the terminal device on a candidate downlink control channel resource corresponding to a third configuration parameter set, where the third configuration parameter set is a specific configuration parameter set in the N configuration parameter sets. Correspondingly, the method further includes: when the terminal device enters, from a slot in which a candidate downlink control channel is not to be detected, a slot in which a candidate downlink control channel is to be detected, or in one or more slots in which the terminal device starts to detect the candidate downlink control channel in an $a^{th}$ discontinuous reception state cycle, detecting a candidate downlink control channel on a resource of the candidate downlink control channel corresponding to a third configuration parameter set, where the third configuration parameter set is a configuration parameter set in the N configuration parameter sets.

If the terminal device needs to switch between configuration parameter sets, it is difficult to ensure that the terminal device and the network device always maintain a same cognition of a configuration parameter set, that is, it is difficult to ensure that the terminal device and the network device always maintain a same configuration parameter set. In view of this, to enable the network device and the terminal device to automatically perform repair after a cognitive error occurs, an embodiment of the application further proposes the following: When the terminal device enters, from a slot in which a candidate downlink control channel is not to be detected, a slot in which a candidate downlink control channel is to be detected, or in one or more slots in which the terminal device starts to detect the candidate PDCCH in an $a^{th}$ DRX cycle, the terminal device automatically enters a third configuration parameter set. The network device also sends a PDCCH corresponding to the third configuration parameter set on a resource of the candidate PDCCH. In this way, at the beginning of each DRX cycle, configuration parameter sets of the network device and the terminal device are always consistent.

In a possible design, the sending information about the N configuration parameter sets to the terminal device includes: sending at least one first message to the terminal device, where the at least one first message is used to indicate the N configuration parameter sets; and sending at least one second message to the terminal device, where the at least one second message is used to indicate one configuration parameter set, the one configuration parameter set is the same as one of the N configuration parameter sets, and the configuration parameter set is one of the N configuration parameter sets or the configuration parameter set is the one configuration parameter set; or sending at least one first message to the terminal device, where the at least one first message is used to indicate (N−1) configuration parameter sets in the N configuration parameter sets; and sending at least one second message to the terminal device, where the at least one second message is used to indicate one remaining configuration parameter set other than the (N−1) configuration parameter sets in the N configuration parameter sets, and the configuration parameter set is one of the (N−1) configuration parameter sets or the configuration parameter set is the one configuration parameter set; or sending at least one first message to the terminal device, where the at least one first message is used to indicate the N configuration parameter sets, and the configuration parameter set is one of the N configuration parameter sets.

Correspondingly, the receiving information about N configuration parameter sets includes: receiving at least one first message, where the at least one first message is used to indicate the N configuration parameter sets; and receiving at least one second message, where the at least one second message is used to indicate one configuration parameter set, the one configuration parameter set is the same as one of the N configuration parameter sets, and the configuration parameter set is one of the N configuration parameter sets or the configuration parameter set is the one configuration parameter set; or receiving at least one first message, where the at least one first message is used to indicate (N−1) configuration parameter sets in the N configuration parameter sets; and receiving at least one second message, where the at least one second message is used to indicate one remaining configuration parameter set other than the (N−1) configuration parameter sets in the N configuration parameter sets, and the configuration parameter set is one of the (N−1) configuration parameter sets or the configuration parameter set is the one configuration parameter set; or receiving at least one first message, where the at least one first message is used to indicate the N configuration parameter sets, and the configuration parameter set is one of the N configuration parameter sets.

In a possible design, the configuration parameter set is one of the N configuration parameter sets, and the at least one first message is further used to indicate that one of the N configuration parameter sets is the configuration parameter set or the configuration parameter set is a default configuration parameter set in the N configuration parameter sets; or the configuration parameter set is one of the (N−1) configuration parameter sets, and the at least one first message is further used to indicate that one of the (N−1) configuration parameter sets is the configuration parameter set or the configuration parameter set is a default configuration parameter set in the (N−1) configuration parameter sets.

The network device may configure the N configuration parameter sets for the terminal device by using the at least one first message and the at least one second message. One configuration parameter set is configured for the terminal device by using the at least one second message, and the configuration parameter sets configured for the terminal device by using the at least one first message may include the one configuration parameter set, that is, the N configuration parameter sets are configured for the terminal device by using the at least one first message, so that the terminal device more clearly knows a configuration of the network device. Alternatively, the configuration parameter sets configured for the terminal device by using the at least one first message may not include the one configuration parameter set, that is, the N−1 configuration parameter sets are configured for the terminal device by using the at least one first message. This helps reduce an information amount of the first message. Alternatively, the network device may not send the second message, but configures the N configuration parameter sets for the terminal device by using the at least one first message, thereby simplifying a configuration process. The third configuration parameter set may be one of the configuration parameter sets configured by using the at least one first message, or may be the configuration parameter set configured by using the at least one second message. If the third configuration parameter set is one of the configuration parameter sets configured by using the at least one first message, in addition to being used to configure the N configuration parameter sets or the N−1 configuration parameter sets, the at least one first message is further used to indicate that one of these configured configuration parameter sets is the third configuration parameter set. Alternatively, if the third configuration parameter set is one of the configuration parameter sets configured by using the at least one first message, the third configuration parameter set may not be indicated by using the at least one first message, instead, one of the configuration parameter sets configured by using the at least one first message is determined as the third configuration parameter set in a default manner or a manner predefined in a protocol. This manner is relatively flexible.

In an example, the third configuration parameter set may be a configuration parameter set that is in the N configuration parameter sets and that corresponds to highest power consumption for detecting the candidate PDCCH by the terminal device. Certainly, an embodiment of the application is not limited thereto.

In a possible design, the sending information about the N configuration parameter sets to the terminal device includes: sending at least one first message to the terminal device, where the at least one first message is used to indicate the N configuration parameter sets; and sending at least one second message to the terminal device, where the at least one second message is used to indicate one configuration parameter set, and the one configuration parameter set is the same as one of the N configuration parameter sets; or sending at least one first message to the terminal device, where the at least one first message is used to indicate (N−1) configuration parameter sets in the N configuration parameter sets; and sending at least one second message to the terminal device, where the at least one second message is used to indicate one remaining configuration parameter set other than the (N−1) configuration parameter sets in the N configuration parameter sets; or sending at least one first message to the terminal device, where the at least one first message is used to indicate the N configuration parameter sets.

Correspondingly, the receiving information about N configuration parameter sets includes: receiving at least one first message, where the at least one first message is used to indicate the N configuration parameter sets; and receiving at least one second message, where the at least one second message is used to indicate one configuration parameter set, and the one configuration parameter set is the same as one of the N configuration parameter sets; or receiving at least one first message, where the at least one first message is used to indicate (N−1) configuration parameter sets in the N configuration parameter sets; and receiving at least one second message, where the at least one second message is used to indicate one remaining configuration parameter set other than the (N−1) configuration parameter sets in the N configuration parameter sets; or receiving at least one first message, where the at least one first message is used to indicate the N configuration parameter sets.

For technical effects of this design, refer to the descriptions of the technical effects of the foregoing design manner.

In a possible design, a candidate downlink control channel resource corresponding to an $i^{th}$ configuration parameter set in the N configuration parameter sets is a subset of a candidate downlink control channel resource corresponding to an $(i-1)^{th}$ configuration parameter set, and i is an integer greater than or equal to 1 and less than or equal to N.

To put it simply, the N configuration parameter sets are nested. When the N configuration parameter sets are configured for the terminal device, the network device may indicate, by using a PDCCH, the terminal device to switch between configuration parameter sets. In this case, if the terminal device misses detecting the PDCCH that is sent by the network device to indicate the terminal device to switch between configuration parameter sets, the terminal device continues to perform detection based on the original configuration parameter set, and the network device sends the PDCCH based on the new configuration parameter set. Consequently, the terminal device misses detecting the PDCCH sent by the network device. It is assumed that the N configuration parameter sets are nested in the manner provided in an embodiment of the application, and when the network device indicates the terminal device to switch between configuration parameter sets, switching can be performed only in descending order of power consumption for detecting the candidate PDCCH by the terminal device corresponding to the configuration parameter set, that is, power consumption for detecting the candidate PDCCH by the terminal device corresponding to the configuration parameter set before the switching needs to be greater than power consumption for detecting the candidate PDCCH by the terminal device after the switching. In this case, according to a nesting rule, a resource of the candidate PDCCH corresponding to the configuration parameter set after the switching is a subset of the resource of the candidate PDCCH corresponding to the configuration parameter set before the switching. In this case, even if the terminal device misses detecting an instruction that is sent by the network device to indicate the terminal device to switch between configuration parameter sets, the terminal device continues to perform detection based on the original configuration parameter set, and the network device sends the PDCCH based on the new configuration parameter set. Because a resource of a candidate PDCCH corresponding to the new configuration parameter set is a subset of a resource of a candidate PDCCH corresponding to the original configuration parameter set, a PDCCH sent by the network device on the resource of the candidate PDCCH corresponding to the new configuration parameter set can still be detected by the terminal device, thereby reducing a possibility that the terminal device misses detecting a PDCCH.

In a possible design, a candidate downlink control channel resource corresponding to an $i^{th}$ configuration parameter set in the N configuration parameter sets is a subset of a candidate downlink control channel resource corresponding to an $(i-1)^{th}$ configuration parameter set, including at least one of the following:

Each of the N configuration parameter sets includes a candidate downlink control channel detection period, a candidate downlink control channel detection period included in the $i^{th}$ configuration parameter set is greater than a candidate downlink control channel detection period included in the $(i-1)^{th}$ configuration parameter set, and the candidate downlink control channel detection period included in the $i^{th}$ configuration parameter set is an integer multiple of the candidate downlink control channel detection period included in the $(i-1)^{th}$ configuration parameter set.

Each of the N configuration parameter sets includes a parameter of a time domain resource set of a candidate downlink control channel, and a time domain resource set of the candidate downlink control channel corresponding to the $i^{th}$ configuration parameter set is a subset of a time domain resource set of the candidate downlink control channel corresponding to the $(i-1)^{th}$ configuration parameter set.

Each of the N configuration parameter sets includes a search space parameter, and a set of candidate downlink control channels of a search space corresponding to the $i^{th}$ configuration parameter set is a subset of a set of candidate downlink control channels of a search space corresponding to the $(i-1)^{th}$ configuration parameter set.

Each of the N configuration parameter sets includes a control resource set parameter, and a control resource set of a candidate downlink control channel corresponding to the $i^{th}$ configuration parameter set is a subset of a control resource set of a candidate downlink control channel corresponding to the $(i-1)^{th}$ configuration parameter set.

Each of the N configuration parameter sets includes a bandwidth part, and a search space of a candidate downlink control channel corresponding to a bandwidth part corresponding to the $i^{th}$ configuration parameter set is a subset of a search space of a candidate downlink control channel corresponding to a bandwidth part corresponding to the $(i-1)^{th}$ configuration parameter set.

Each of the N configuration parameter sets includes a bandwidth part, and a control resource set of a candidate downlink control channel corresponding to a bandwidth part corresponding to the $i^{th}$ configuration parameter set is a subset of a control resource set of a candidate downlink control channel corresponding to a bandwidth part corresponding to the $(i-1)^{th}$ configuration parameter set.

The parameter of the time domain resource set may indicate, for example, a size and a location of the time domain resource set, and the parameter of the search space may indicate, for example, a set of candidate PDCCHs of the search space. The several parameters are merely examples. In an embodiment of the application, it is necessary that a resource of the candidate PDCCH corresponding to the $i^{th}$ configuration parameter set in the N configuration parameter sets is a subset of a resource of the candidate PDCCH corresponding to the $(i-1)^{th}$ configuration parameter set, but parameters that are used for implementation are not limited. For example, one or more parameters described above may be used for implementation, or one or more parameters described above may be combined with another parameter for implementation, or a parameter other than the parameters described above may be used for implementation. This is not limited in an embodiment of the application.

In a possible design, the method further includes: sending first downlink control information to the terminal device, where the first downlink control information is used to indicate a first configuration parameter set in the N configuration parameter sets, a candidate downlink control channel resource corresponding to the first configuration parameter set is a subset of a candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle. Correspondingly, the method further includes: receiving first downlink control information, where the first downlink control information is used to indicate a first configuration parameter set in the N configuration parameter sets, a candidate downlink control channel resource corresponding to the first configuration parameter set is a subset of a candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle.

For example, the configuration parameter set used when the terminal device detects the first downlink control information is the second configuration parameter set in the N configuration parameter sets. If the first configuration parameter set is different from the second configuration parameter set, it may be understood that the first downlink control information is information used to indicate the terminal device to switch between configuration parameter sets. If the first configuration parameter set is the same as the second configuration parameter set, it may be understood that the first downlink control information is information used to indicate the terminal device not to switch between configuration parameter sets. When notification information is implemented by using the first downlink control information, each configuration parameter set included in the N configuration parameter sets needs to be set in the nesting manner described above, and it may be specified that when the network device indicates the terminal device to switch between configuration parameter sets, a resource of a candidate PDCCH corresponding to a configuration parameter set after the switching needs to be a subset of a resource of a candidate PDCCH corresponding to a configuration parameter set before the switching. In this way, a possibility that the terminal device misses detecting a PDCCH can be reduced.

In a possible design, the method further includes: sending second downlink control information to a terminal device group, where the second downlink control information includes at least one piece of indication information, and each of the at least one piece of indication information is used to indicate a configuration parameter set in the N configuration parameter sets for one or more terminal devices in the terminal device group. Correspondingly, the method further includes: receiving second downlink control information; and determining a second configuration parameter set in the N configuration parameter sets based on first indication information included in the second downlink control information, where the second downlink control information is downlink control information based on a terminal device group, the first downlink control information includes at least one piece of indication information, each of the at least one piece of indication information is used to indicate a configuration parameter set for one or more terminal devices in the terminal device group, the terminal device belongs to the terminal device group, and the first indication information corresponds to the terminal device.

In other words, the second downlink control information may be downlink control information based on the terminal device group. The network device may send the second downlink control information in a multicast or broadcast sending manner. After receiving the second downlink control information, the terminal device in the terminal device group may determine, based on the indication information corresponding to the terminal device in the at least one piece of indication information included in the second downlink control information, a configuration parameter set after the switching or determine not to switch between configuration parameter sets. In this way, the configuration parameter sets of the plurality of terminal devices can be indicated by sending one piece of second downlink control information, thereby helping save transmission resources.

In a possible design, the method further includes: sending a MAC CE to the terminal device, where the MAC CE is used to indicate a first configuration parameter set, and the first configuration parameter set is one of the N configuration parameter sets. Correspondingly, the method further includes: receiving a MAC CE, where the MAC CE is used to indicate a first configuration parameter set, and the first configuration parameter set is one of the N configuration parameter sets.

Because the MAC CE is carried on a PDSCH, after the network device sends the MAC CE, the terminal device returns physical layer acknowledgement information to the network device. This handshake communication mechanism can basically ensure that the network device clearly determines whether the terminal device misses detecting the MAC CE, thereby basically ensuring that the network device and the terminal device work based on a same configuration parameter set. Therefore, if the network device sends the MAC CE, a setting manner of the N configuration parameter sets may not be limited, and the N configuration parameter sets may be set in a nesting manner, or may not be set in a nesting manner. In addition, when the network device indicates the terminal device to switch between configuration parameter sets, a resource of a candidate PDCCH corresponding to a configuration parameter set after the switching does not need to be a subset of a resource of a candidate PDCCH corresponding to a configuration parameter set before the switching. In other words, there is no need to limit the configuration parameter set after the switching, and the resource of the candidate PDCCH corresponding to the configuration parameter set after the switching may be or may not be a subset of the resource of the candidate PDCCH corresponding to the configuration parameter set before the switching. This manner is more flexible.

According to a third aspect, a first communications apparatus is provided. The communications apparatus is, for example, the first communications apparatus described above, for example, a network device. The communications apparatus has functions of implementing the network device in the foregoing method design. The functions may be implemented by hardware, or may be implemented by hardware executing corresponding software. The hardware or the software includes one or more modules corresponding to the foregoing functions.

In a possible design, a structure of the communications apparatus may include a processing module and a transceiver module. The processing module and the transceiver module may perform corresponding functions in the method provided in any one of the first aspect or the possible implementations of the first aspect.

According to a fourth aspect, a second communications apparatus is provided. The communications apparatus is, for example, the second communications apparatus described above, for example, a terminal device. The communications apparatus has functions of implementing the terminal device in the foregoing method design. The functions may be implemented by hardware, or may be implemented by hardware executing corresponding software. The hardware or the software includes one or more modules corresponding to the foregoing functions.

In a possible design, a structure of the communications apparatus may include a processing module and a transceiver module. The processing module and the transceiver module may perform corresponding functions in the method provided in any one of the second aspect or the possible implementations of the second aspect.

According to a fifth aspect, a third communications apparatus is provided. The communications apparatus is, for example, the first communications apparatus described above, for example, a network device. The communications apparatus has functions of implementing the network device in the foregoing method design. The functions may be implemented by hardware, or may be implemented by hardware executing corresponding software. The hardware or the software includes one or more modules corresponding to the foregoing functions.

In a possible design, a structure of the communications apparatus may include a processor and a transceiver. The processor and the transceiver may perform corresponding functions in the method provided in any one of the first aspect or the possible implementations of the first aspect. For example, the transceiver is implemented as a communications interface. The communications interface herein may be understood as a radio frequency transceiver component in the network device.

According to a sixth aspect, a fourth communications apparatus is provided. The communications apparatus is, for example, the second communications apparatus described above, for example, a terminal device. The communications apparatus has functions of implementing the terminal device in the foregoing method design. The functions may be implemented by hardware, or may be implemented by hardware executing corresponding software. The hardware or the software includes one or more modules corresponding to the foregoing functions.

In a possible design, a structure of the communications apparatus may include a processor and a transceiver. The processor and the transceiver may perform corresponding functions in the method provided in any one of the second aspect or the possible implementations of the second aspect. For example, the transceiver is implemented as a communications interface. The communications interface herein may be understood as a radio frequency transceiver component in the terminal device.

According to a seventh aspect, a fifth communications apparatus is provided. The communications apparatus may be the first communications apparatus in the foregoing method designs, for example, a network device or a chip disposed in the network device. The communications apparatus includes: a memory, configured to store computer-executable program code; and a processor, where the processor is coupled to the memory. The program code stored in the memory includes an instruction, and when the processor executes the instruction, the fifth communications apparatus is enabled to perform the method in any one of the first aspect or the possible implementations of the first aspect.

The fifth communications apparatus may further include a communications interface. If the fifth communications apparatus is the network device, the communications interface may be a transceiver in the network device, for example, a radio frequency transceiver component in the network device; or if the fifth communications apparatus is the chip disposed in the network device, the communications interface may be an input/output interface of the chip, for example, an input/output pin.

According to an eighth aspect, a sixth communications apparatus is provided. The communications apparatus may be the second communications apparatus in the foregoing method designs, for example, a terminal device or a chip disposed in the terminal device. The communications apparatus includes: a memory, configured to store computer-executable program code; and a processor, where the processor is coupled to the memory. The program code stored in the memory includes an instruction, and when the processor executes the instruction, the sixth communications apparatus is enabled to perform the method in any one of the second aspect or the possible implementations of the second aspect.

The sixth communications apparatus may further include a communications interface. If the sixth communications apparatus is the terminal device, the communications interface may be a transceiver in the terminal device, for example, a radio frequency transceiver component in the terminal device; or if the sixth communications apparatus is the chip disposed in the terminal device, the communications interface may be an input/output interface of the chip, for example, an input/output pin.

According to a ninth aspect, a first communications system is provided. The communications system may include the first communications apparatus in the third aspect and the second communications apparatus in the fourth aspect.

According to a tenth aspect, a second communications system is provided. The communications system may include the third communications apparatus in the fifth aspect and the fourth communications apparatus in the sixth aspect.

According to an eleventh aspect, a third communications system is provided. The communications system may include the fifth communications apparatus in the seventh aspect and the sixth communications apparatus in the eighth aspect.

According to a twelfth aspect, a computer-readable storage medium is provided. The computer-readable storage medium stores an instruction. When the instruction is run on a computer, the computer is enabled to perform the method in any one of the first aspect or the possible designs of the first aspect.

According to a thirteenth aspect, a computer storage medium is provided. The computer-readable storage medium stores an instruction. When the instruction is run on a computer, the computer is enabled to perform the method in any one of the second aspect or the possible designs of the second aspect.

According to a fourteenth aspect, a computer program product including an instruction is provided. The computer program product stores the instruction. When the instruction is run on a computer, the computer is enabled to perform the method in any one of the first aspect or the possible designs of the first aspect.

According to a fifteenth aspect, a computer program product including an instruction is provided. The computer program product stores the instruction. When the instruction is run on a computer, the computer is enabled to perform the method in any one of the second aspect or the possible designs of the second aspect.

In at least one embodiment of the application, the N configuration parameter sets may be configured for the terminal device. For example, power consumption for correspondingly detecting the candidate PDCCH may be different when the terminal device uses two of the N configuration parameter sets. Therefore, power consumption of the terminal device can be reduced, and a service life of the terminal device can be prolonged.

DESCRIPTION OF EMBODIMENTS

Figure 1:
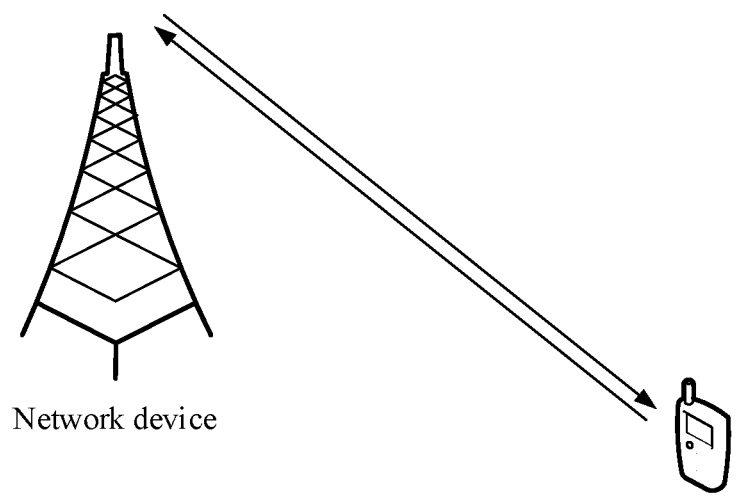
FIG. 1 is a schematic diagram of an application scenario according to an embodiment of the application.

To make objectives, technical solutions, and advantages of the embodiments of the application clearer, the following further describes the embodiments of the application in detail with reference to the accompanying drawings.

The following describes some terms in the embodiments of the application, to facilitate understanding of one of ordinary skill in the art.

(1) Terminal device: The terminal device includes a device that provides a user with voice and/or data connectivity, for example, may include a handheld device having a wireless connection function or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile station (mobile), a remote station, an access point (AP), a remote terminal device, an access terminal device, a user terminal device, a user agent, a user device, or the like. For example, the terminal device may include a mobile phone (or referred to as a "cellular" phone), a computer having a mobile terminal device, a portable, pocket-sized, handheld, computer built-in, or an in-vehicle mobile apparatus, or a smart wearable device. For example, the terminal device is a device such as a personal communications service (PCS) phone, a cordless telephone set, a session initiation protocol (SIP) phone, a wireless local loop (WLL) station, or a personal digital assistant (PDA). The terminal device alternatively includes a limited device, for example, a device with low power consumption, a device with a limited storage capability, or a device with a limited computing capability. For example, the terminal device includes an information sensing device such as a barcode, a radio frequency identification (RFID) device, a sensor, a global positioning system (GPS), or a laser scanner.

By way of example and not limitation, in the embodiments of the application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn by a user or integrated into clothes or an accessory of the user. The wearable device is not only a hardware device, but is used to implement powerful functions through software support, data exchange, and cloud interaction. In a broad sense, the wearable intelligent device includes full-featured and large-sized devices that can implement all or some functions without depending on smartphones, for example, smartwatches or smart glasses, and devices that focus on only one type of application function and need to work with other devices such as smartphones, for example, various smart bands, smart helmets, or smart jewelry for monitoring physical signs.

(2) Network device: The network device includes, for example, a base station (for example, an access point), and may be a device that is in an access network and that communicates with a wireless terminal device over an air interface in one or more cells. The network device may be configured to: mutually convert a received over-the-air frame and an internet protocol (IP) packet, and serve as a router between the terminal device and a rest portion of the access network. The rest portion of the access network may include an IP network. The network device may further coordinate attribute management of the air interface. For example, the network device may include an evolved NodeB (NodeB or eNB or e-NodeB, evolutional Node B) in a long term evolution (LTE) system or an LTE-advanced (LTE-A) system, or may include a next generation NodeB (next generation node B, gNB) in a fifth generation (5G) new radio (NR) system, or may include a centralized unit (CU) and a distributed unit DU) in a cloud access network (e.g., cloud radio access network, CloudRAN) system. This is not limited in the embodiments of the application.

(3) DRX: In a DRX mechanism, the terminal device stops listening on a PDCCH in a period of time. DRX is classified into IDLE DRX and C-DRX.

IDLE DRX is discontinuous reception of the terminal device in an idle state. When the terminal device is in an idle state, there is no radio resource control (RRC) connection and no dedicated resource of the terminal device. Therefore, in IDLE DRX, the terminal device mainly listens on a call channel and a broadcast channel, and discontinuous reception can be achieved as long as a fixed period is defined. If the terminal device needs to listen on a user data channel, the terminal device needs to first enter a connected state from an idle state.

C-DRX is DRX in which the terminal device is in an RRC connected state. In C-DRX, the terminal device periodically performs blind detection on a candidate PDCCH. During blind detection, the terminal device usually performs detection based on a configuration for highest power consumption of candidate PDCCH detection. If the terminal device cannot detect a PDCCH within a period of time, the terminal device enters an off (OFF) state. In an off state, the terminal device stops candidate PDCCH detection, to reduce power consumption of candidate PDCCH detection by the terminal device.

(4) Downlink control channel: The downlink control channel is, for example, a PDCCH or an enhanced physical downlink control channel (EPDCCH), or may be another downlink control channel. In this specification, an example in which the downlink control channel is a PDCCH is used for description, in other words, "PDCCH" described below may be replaced with "downlink control channel".

(5) In the embodiments of the application, the terms "system" and "network" may be used interchangeably, and "a plurality of" means two or more. In view of this, in the embodiments of the application, "a plurality of" may also be understood as "at least two", and "at least one" may be understood as one or more, for example, understood as one, two, or more. For example, including at least one means including one, two, or more, and does not limit what are included. For example, including at least one of A, B, and C may represent the following cases: A is included, B is included, C is included, A and B are included, A and C are included, B and C are included, or A and B and C are included. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise stated, in the embodiments of the application, ordinal numbers such as "first" and "second" are used to distinguish between a plurality of objects, and not intended to limit an order, a time sequence, a priority, or importance of the plurality of objects.

First, technical features in the embodiments of the application are described.

In C-DRX, the terminal device periodically performs blind detection on a candidate PDCCH. During blind detection, the terminal device usually performs detection based on a configuration for highest power consumption of candidate PDCCH detection. If the terminal device cannot detect a PDCCH within a period of time, the terminal device enters an off state. In an off state, the terminal device stops candidate PDCCH detection, to reduce power consumption of candidate PDCCH detection by the terminal device. It can be learned that, in a state in which the terminal device detects a candidate PDCCH, the terminal device usually performs detection based on a configuration for highest power consumption of candidate PDCCH detection. Consequently, power consumption of candidate PDCCH detection is relatively high. In addition, in the C-DRX mechanism, the terminal device has only two states: a state in which the terminal device detects a candidate PDCCH and a state in which the terminal device does not detect a candidate PDCCH (that is, an off state). Therefore, flexibility in which the terminal device balances power consumption of candidate PDCCH detection with a service delay is restricted to some extent.

In view of this, the embodiments of the application provide technical solutions. In the embodiments of the application, N configuration parameter sets may be configured for the terminal device. For example, when the terminal device is in two of the N configuration parameter sets, corresponding power consumption of candidate PDCCH detection may be different. Therefore, the terminal device may be in states with different power consumption for detecting the candidate PDCCHs by enabling the terminal device to switch between configuration parameter sets, thereby reducing a probability that the terminal device is always in a state with highest power consumption for detecting the candidate PDCCHs. In this manner, power consumption of candidate PDCCH detection by the terminal device can be reduced, and a service life of the terminal device can be prolonged.

The technical solutions provided in the embodiments of the application may be applied to a 5G system, for example, an LTE system, or may be applied to a next generation mobile communications system or another similar communications system. This is not specifically limited.

The following describes a network architecture to which an embodiment of the application is applied. Refer to FIG. 1.

FIG. 1 includes a network device and a terminal device, and the terminal device is connected to the network device. Certainly, a quantity of terminal devices in FIG. 1 is merely an example. In actual application, the network device may serve a plurality of terminal devices, and the network device may configure N configuration parameter sets for all or some of the plurality of terminal devices.

The network device in FIG. 1 is, for example, an access network (AN) device, for example, a base station. The access network device corresponds to different devices in different systems. For example, the access network device may correspond to an eNB in a 4th generation (4G) mobile communications technology system, and correspond to an access network device in 5G in a 5th generation (5G) mobile communications technology system, for example, a gNB.

The following describes the technical solutions provided in the embodiments of the application with reference to the accompanying drawings.

Figure 2:
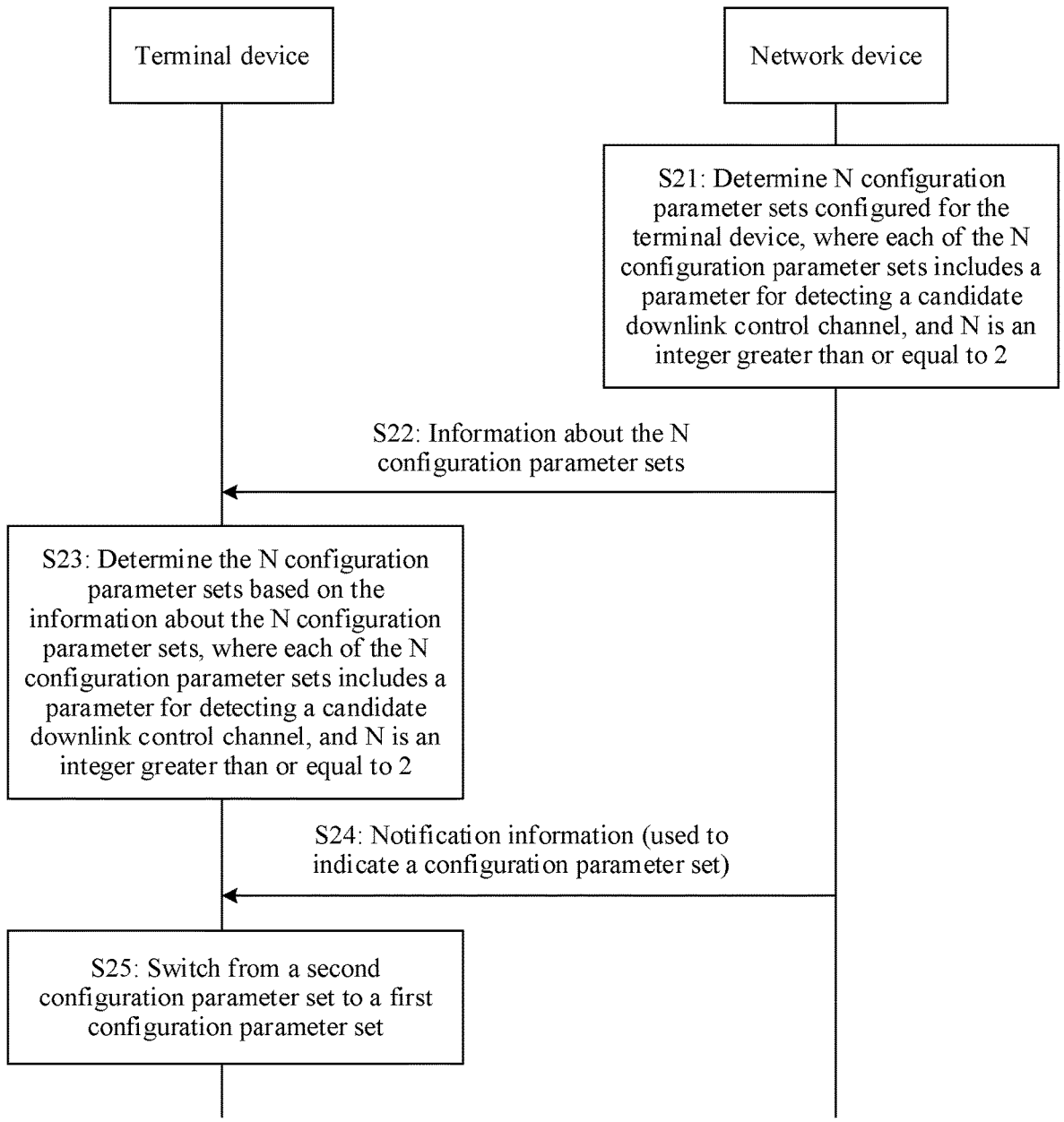
FIG. 2 is a flowchart of a communication method according to an embodiment of the application.

An embodiment of the application provides a communication method. FIG. 2 is a flowchart of the method. In the following description process, an example in which the method is applied to the network architecture shown in FIG. 1 is used. In other words, the network device described below may be the network device in the network architecture shown in FIG. 1, and the terminal device described below may be the terminal device in the network architecture shown in FIG. 1. In addition, the method may be performed by two communications apparatuses. The two communications apparatuses are, for example, a first communications apparatus and a second communications apparatus. The first communications apparatus may be a network device or a communications apparatus that can support a function required by the network device to implement the method. Alternatively, the first communications apparatus may be a terminal device or a communications apparatus that can support a function required by the terminal device to implement the method. Certainly, the first communications apparatus may be another communications apparatus, for example, a chip system. Similarly, the second communications apparatus may be a network device or a communications apparatus that can support a function required by the network device to implement the method. Alternatively, the second communications apparatus may be a terminal device or a communications apparatus that can support a function required by the terminal device to implement the method. Certainly, the second communications apparatus may be another communications apparatus, for example, a chip system. In addition, implementations of the first communications apparatus and the second communications apparatus are not limited. For example, the first communications apparatus may be a network device, and the second communications apparatus is a terminal device; or both the first communications apparatus and the second communications apparatus are network devices; or both the first communications apparatus and the second communications apparatus are terminal devices; or the first communications apparatus is a network device, and the second communications apparatus is a communications apparatus that can support a function required by the terminal device to implement the method. The network device is, for example, a base station.

An embodiment proposes N configuration parameter sets configured for the terminal device. It may be understood that types of parameters included in the N configuration parameter sets may be the same, or at least one parameter has a different type. However, values included in the N configuration parameter sets are not completely the same. For example, a configuration parameter set 1 includes two types of parameters: a candidate PDCCH detection period and a BWP, and a configuration parameter set 2 also includes two types of parameters: a candidate PDCCH detection period and a BWP. A value of the candidate PDCCH detection period in the configuration parameter set 1 is different from a value of the candidate PDCCH detection period in the configuration parameter set 2; or a value of the BWP in the configuration parameter set 1 is different from a value of the BWP in the configuration parameter set 2; or a value of the candidate PDCCH detection period in the configuration parameter set 1 is different from a value of the candidate PDCCH detection period in the configuration parameter set 2, and a value of the BWP in the configuration parameter set 1 is different from a value of the BWP in the configuration parameter set 2.

Each of the N configuration parameter sets may include at least one parameter. For example, each of the N configuration parameter sets includes a parameter for detecting a candidate PDCCH. The parameter for detecting a candidate PDCCH that is included in each of the N configuration parameter sets includes, for example, at least one of the following: a candidate PDCCH detection period, a time domain resource set corresponding to the candidate PDCCH, a search space parameter, a control resource set parameter, or a bandwidth part (BWP).

Certainly, the configuration parameter set may further include another parameter for detecting a candidate PDCCH. This is not specifically limited. In addition, types of parameters included in different configuration parameter sets in the N configuration parameter sets may be the same. For example, each of the N configuration parameter sets includes a candidate PDCCH detection period, a time domain resource set corresponding to the candidate PDCCH, a search space parameter, a control resource set parameter, or a BWP. Alternatively, types of parameters included in different configuration parameter sets in the N configuration parameter sets may be different, but have an intersection set. For example, one configuration parameter set in the N configuration parameter sets includes two types of parameters: a candidate PDCCH detection period and a time domain resource set corresponding to the candidate PDCCH, and another configuration parameter set in the N configuration parameter sets includes two types of parameters: a candidate PDCCH detection period and a search space parameter.

For example, each of the N configuration parameter sets may include only at least one of these parameters, for example, include only a candidate downlink control channel detection period, or include only a bandwidth part, or the like. Alternatively, each of the N configuration parameter sets may include at least two of these parameters. For example, each of the N configuration parameter sets may include a search space parameter, a candidate downlink control channel detection period, and the like.

It should be noted that a parameter included in each configuration parameter set corresponds to the configuration parameter set. In addition, different configuration parameter sets may include parameters of a same type, or may include parameters of different types. This is not limited in an embodiment of the application.

For ease of description, the following uses an example in which the method is performed by a network device and a terminal device, that is, an example in which the first communications apparatus is a network device and the second communications apparatus is a terminal device.

S21. The network device determines N configuration parameter sets configured for the terminal device, where each of the N configuration parameter sets includes a parameter for detecting a candidate downlink control channel, and N is an integer greater than or equal to 2.

S22. The network device sends information about the N configuration parameter sets to the terminal device.

S23. The terminal device determines the N configuration parameter sets based on the information about the N configuration parameter sets, where each of the N configuration parameter sets includes a parameter for detecting a candidate downlink control channel, and N is an integer greater than or equal to 2.

After determining the N configuration parameter sets configured for the terminal device, the network device may send the information about the N configuration parameter sets to the terminal device, to configure the N configuration parameter sets for the terminal device.

The network device may send the information about the N configuration parameter sets to the terminal device in different manners. The following separately describes the manners.

Manner 1: At least one first message and at least one second message are used for sending, and there is an intersection set between a configuration parameter set configured by using the at least one first message and a configuration parameter set configured by using the at least one second message different configuration parameter sets are configured by using the at least one first message and the at least one second message.

For example, the network device may send the at least one first message to the terminal device, and the terminal device receives the at least one first message from the network device. The at least one first message is used to indicate the N configuration parameter sets. In other words, the at least one first message may be used to configure the N configuration parameter sets. There may be one or more first messages. For example, a quantity of first messages may be M, and the M first messages are used to configure one configuration parameter set. Alternatively, there may be one first message, and the first message is used to configure the N configuration parameter sets. Each of the at least one first message is, for example, an RRC message. M may be greater than N, or may be less than or equal to N.

In addition, the network device may send the at least one second message to the terminal device, and the terminal device receives the at least one second message from the network device. The at least one second message is used to configure one configuration parameter set for the terminal device. There may be one or more second messages. Each of the at least one second message is, for example, an RRC message.

In Manner 1, the N configuration parameter sets may include the configuration parameter set configured by using the at least one second message. It may be understood that the configuration parameter set configured by using the at least one second message is a configuration parameter set configured by the network device for the terminal device in the prior art. In the prior art, the network device configures only one configuration parameter set for the terminal device. All or some of the at least one configuration parameter set configured by using the at least one first message are configuration parameter sets additionally configured by the network device for the terminal device that are proposed in an embodiment of the application. When the network device additionally configures the configuration parameter set for the terminal device by using the first message, the configuration parameter set configured by using the second message may be configured again, so that the terminal device more clearly knows a total quantity of configuration parameter sets configured by the network device. In this case, the network device configures N configuration parameter sets for the terminal device by using the at least one first message, and the N configuration parameter sets include the configuration parameter set configured by the network device for the terminal device by using the at least one second message. In addition to the configuration parameter set (that is, the configuration parameter set configured for the terminal device by using the at least one second message) configured by the network device for the terminal device in the prior art, the network device additionally configures N−1 configuration parameter sets for the terminal device. Therefore, the network device configures the N configuration parameter sets for the terminal device in total.

If the information about the N configuration parameter sets is sent in Manner 1, the network device may first determine one configuration parameter set indicated by using the at least one second message, and then determine the information about the N configuration parameter sets indicated by using the at least one first message. During sending, the at least one second message may be first sent, and then the at least one first message is sent. Alternatively, the N configuration parameter sets indicated by using the at least one first message may be first determined, and then information about the configuration parameter set indicated by using the at least one second message is determined. During sending, the at least one first message may be first sent, and then the at least one second message is sent. Alternatively, the N configuration parameter sets may be simultaneously determined. During sending, the at least one second message may be first sent, and then the at least one first message is sent; or the at least one first message is first sent, and then the at least one second message is sent; or the at least one first message and the at least one second message are simultaneously sent.

Manner 2: At least one first message and at least one second message are used for sending, and different configuration parameter sets are configured by using the at least one first message and the at least one second message.

For example, the network device may send the at least one first message to the terminal device, and the terminal device receives the at least one first message from the network device. The at least one first message is used to indicate the N configuration parameter sets. In other words, the at least one first message may be used to configure the N configuration parameter sets. There may be one or more first messages. For example, a quantity of first messages may be N, and one first message is used to configure one configuration parameter set. Alternatively, there may be one first message, and the first message is used to configure the N configuration parameter sets. Each of the at least one first message is, for example, an RRC message.

In addition, the network device may send the at least one second message to the terminal device, and the terminal device receives the at least one second message from the network device. The at least one second message is used to configure one configuration parameter set for the terminal device. There may be one or more second messages. Each of the at least one second message is, for example, an RRC message.

In Manner 2, the N configuration parameter sets may not include the configuration parameter set configured by using the at least one second message. It may be understood that the configuration parameter set configured by using the at least one second message is a configuration parameter set configured by the network device for the terminal device in the prior art. In the prior art, the network device configures only one configuration parameter set for the terminal device. The at least one configuration parameter set configured by using the at least one first message is a configuration parameter set additionally configured by the network device for the terminal device that is proposed in an embodiment of the application. The network device may configure one configuration parameter set for the terminal device by using the at least one second message, and configure N−1 configuration parameter sets for the terminal device by using the at least one first message. When configuring the N−1 configuration parameter sets, the network device does not need to configure the configuration parameter set that has been configured by using the at least one second message. This helps save transmission resources. In this case, the network device configures the N−1 configuration parameter sets for the terminal device by using the at least one first message, and the N−1 configuration parameter sets do not include the configuration parameter set configured by the network device for the terminal device by using the at least one second message. In addition to the configuration parameter set (that is, the configuration parameter set configured for the terminal device by using the at least one second message) configured by the network device for the terminal device in the prior art, the network device additionally configures the N−1 configuration parameter sets for the terminal device. Therefore, the network device configures the N configuration parameter sets for the terminal device in total.

If the information about the N configuration parameter sets is sent in Manner 2, the network device may first determine the configuration parameter set indicated by using the at least one second message, and then determine the information about the N−1 configuration parameter sets indicated by using the at least one first message. During sending, the at least one second message may be first sent, and then the at least one first message is sent. Alternatively, the N−1 configuration parameter sets indicated by using the at least one first message may be first determined, and then information about the configuration parameter set indicated by using the at least one second message is determined. During sending, the at least one first message may be first sent, and then the at least one second message is sent. Alternatively, the N−1 configuration parameter sets may be simultaneously determined. During sending, the at least one second message may be first sent, and then the at least one first message is sent; or the at least one first message is first sent, and then the at least one second message is sent; or the at least one first message and the at least one second message are simultaneously sent.

Manner 3: At least one first message is used for sending.

For example, the network device may send the at least one first message to the terminal device, and the terminal device receives the at least one first message from the network device. The at least one first message is used to indicate the N configuration parameter sets. In other words, the at least one first message may be used to configure the N configuration parameter sets. There may be one or more first messages. For example, a quantity of first messages may be N, and one first message is used to configure one configuration parameter set. Alternatively, there may be one first message, and the first message is used to configure the N configuration parameter sets. Each of the at least one first message is, for example, an RRC message.

In Manner 3, the network device no longer sends the second message to the terminal device, and the N configuration parameter sets are configured by using the at least one first message. This manner is relatively simple. In this case, the N configuration parameter sets may include a configuration parameter set configured by the network device for the terminal device in the prior art, or may not include a configuration parameter set configured by the network device for the terminal device in the prior art, but are all configuration parameter sets re-configured for the terminal device in an embodiment of the application.

Which one of the foregoing three manners is used by the network device to configure the N configuration parameter sets for the terminal device may be selected by the network device, or may be predefined in a protocol, or the like. This is not specifically limited.

In an embodiment of the application, some or all of the N configuration parameter sets may correspond to same candidate PDCCH resources. In this case, corresponding power consumption for detecting a candidate PDCCH by the terminal device when the terminal device uses these configuration parameter sets is similar. Alternatively, the N configuration parameter sets include at least two configuration parameter sets, and the at least two configuration parameter sets correspond to different candidate PDCCH resources. In this case, when using the at least two configuration parameter sets, the terminal device consumes largely different amounts of power for detecting a candidate PDCCH. Alternatively, different configuration parameter sets in the N configuration parameter sets correspond to different candidate PDCCH resources. In this case, when using different configuration parameter sets in the N configuration parameter sets, the terminal device consumes largely different amounts of power for detecting a candidate PDCCH.

When the N configuration parameter sets are configured for the terminal device, if the terminal device is in a state of detecting a candidate PDCCH in a DRX cycle, the network device may indicate the terminal device to switch a configuration parameter set. If power consumption of detecting a candidate PDCCH by the terminal device corresponding to some or all configuration parameter sets in the N configuration parameter sets varies greatly, power consumption of detecting a candidate PDCCH by the terminal device can be reduced to some extent by switching a configuration parameter set. In this case, the following problem may exist. For example, the network device indicates, by using downlink control information, the terminal device to perform configuration parameter set switching. In this case, if the terminal device misses the downlink control information that is sent by the network device and that is used to indicate the terminal device to perform configuration parameter set switching, the terminal device continues to perform detection based on an original configuration parameter set, but the network device sends a PDCCH based on a new configuration parameter set. Consequently, the terminal device may miss the PDCCH sent by the network device. For example, the network device indicates, by using the downlink control information, the terminal device to switch from a candidate PDCCH detection period 1 to a candidate PDCCH detection period 2, where the candidate PDCCH detection period 1 is greater than the candidate PDCCH detection period 2. The terminal device misses the PDCCH used to indicate switching. In this case, the network device sends a PDCCH on a resource corresponding to the candidate PDCCH detection period 2, but the terminal device still detects a candidate PDCCH on a resource corresponding to the candidate PDCCH detection period 1. Consequently, the terminal device misses the PDCCH.

In consideration of the foregoing problem, an embodiment of the application proposes that the N configuration parameter sets may be set in a nested manner. The nested setting may be simply understood as following: If the N configuration parameter sets are sorted in descending order of power consumption for detecting a candidate PDCCH by the terminal device, a candidate PDCCH resource corresponding to a configuration parameter set in the sequence is a subset of a candidate PDCCH resource corresponding to a previous configuration parameter set in the sequence. Preferably, the subset may be a proper subset. Alternatively, it may be understood that a candidate PDCCH resource corresponding to an $i^{th}$ configuration parameter set included in the N configuration parameter sets is a subset of a candidate PDCCH resource corresponding to an $(i-1)^{th}$ configuration parameter set. Preferably, the subset may be a proper subset. Herein, i is an integer greater than or equal to 1 and less than or equal to N. It should be noted that i herein is merely a sequence number written when the N configuration parameter sets are nested, and is not a sequence number for the N configuration parameter sets indicated by the at least one first message or the at least one second message, and is irrelevant to a sending time, a sending sequence, or the like of the at least one first message or the at least one second message. In other words, i represents only a nesting relationship between the N configuration parameter sets, and other restrictive explanations cannot be made.

If the N configuration parameter sets are nested, and it is stipulated that the network device indicates the terminal device to switch the configuration parameter sets only in descending order of power consumption for detecting a candidate PDCCH by the terminal device, that is, power consumption for detecting a candidate PDCCH by the terminal device corresponding to a configuration parameter set used before the switching needs to be greater than power consumption for detecting a candidate PDCCH by the terminal device corresponding to a configuration parameter set used after the switching, according to a nested setting rule, a candidate PDCCH resource corresponding to the configuration parameter set used after the switching is a subset of a candidate PDCCH resource corresponding to the configuration parameter set used before the switching. In this case, even if the terminal device misses an instruction that is sent by the network device and that is used to indicate the terminal device to switch the configuration parameter set, the terminal device continues to perform detection based on an original configuration parameter set, but the network device sends a PDCCH based on a new configuration parameter set, the PDCCH sent by the network device on a candidate PDCCH resource corresponding to the new configuration parameter set can still be detected by the terminal device because the candidate PDCCH resource corresponding to the new configuration parameter set is a subset of a candidate PDCCH resource corresponding to the original configuration parameter set, thereby reducing a possibility that the terminal device misses the PDCCH.

As described above, the configuration parameter set may include at least one parameter. In this case, a candidate PDCCH resource corresponding to the configuration parameter set may be defined by using the at least one parameter. One or more of the at least one parameter may be controlled, to enable the candidate PDCCH resource corresponding to the $i^{th}$ configuration parameter set included in the N configuration parameter sets to be a subset of the candidate PDCCH resource corresponding to the $(i-1)^{th}$ configuration parameter set. In an embodiment, that the candidate PDCCH resource corresponding to the $i^{th}$ configuration parameter set included in the N configuration parameter sets is a subset of the candidate PDCCH resource corresponding to the $(i-1)^{th}$ configuration parameter set may include at least one of the following:

each of the N configuration parameter sets includes a candidate PDCCH detection period, a candidate PDCCH detection period corresponding to the $i^{th}$ configuration parameter set is greater than a candidate PDCCH detection period corresponding to the $(i-1)^{th}$ configuration parameter set, and the candidate PDCCH detection period corresponding to the $i^{th}$ configuration parameter set is an integer multiple of the candidate PDCCH detection period corresponding to the $(i-1)^{th}$ configuration parameter set;

each of the N configuration parameter sets includes a parameter of a time domain resource set of a candidate PDCCH, and a time domain resource set for detecting a candidate PDCCH corresponding to the $i^{th}$ configuration parameter set is a subset of a time domain resource set for detecting a candidate PDCCH corresponding to the $(i-1)^{th}$ configuration parameter set;

each of the N configuration parameter sets includes a search space parameter, and a set of candidate PDCCHs of a search space corresponding to the $i^{th}$ configuration parameter set is a subset of a set of candidate PDCCHs of a search space corresponding to the $(i-1)^{th}$ configuration parameter set;

each of the N configuration parameter sets includes a control resource set parameter, and a control resource set of a candidate PDCCH corresponding to the $i^{th}$ configuration parameter set is a subset of a control resource set of a candidate PDCCH corresponding to the $(i-1)^{th}$ configuration parameter set;

each of the N configuration parameter sets includes a bandwidth part, and a set of candidate PDCCHs of a search space corresponding to a BWP corresponding to the $i^{th}$ configuration parameter set is a subset of a set of candidate PDCCHs of a search space corresponding to a BWP corresponding to the $(i-1)^{th}$ configuration parameter set; and each of the N configuration parameter sets includes a bandwidth part, and a control resource set of a candidate PDCCH corresponding to a BWP corresponding to the $i^{th}$ configuration parameter set is a subset of a control resource set of a candidate PDCCH corresponding to a BWP corresponding to the $(i-1)^{th}$ configuration parameter set.

The following separately describes the foregoing parameters.

1. The candidate PDCCH detection period corresponding to the $i^{th}$ configuration parameter set is greater than the candidate PDCCH detection period corresponding to the $(i-1)^{th}$ configuration parameter set, and the candidate PDCCH detection period corresponding to the $i^{th}$ configuration parameter set is an integer multiple of the candidate PDCCH detection period corresponding to the $(i-1)^{th}$ configuration parameter set.

Figure 3:
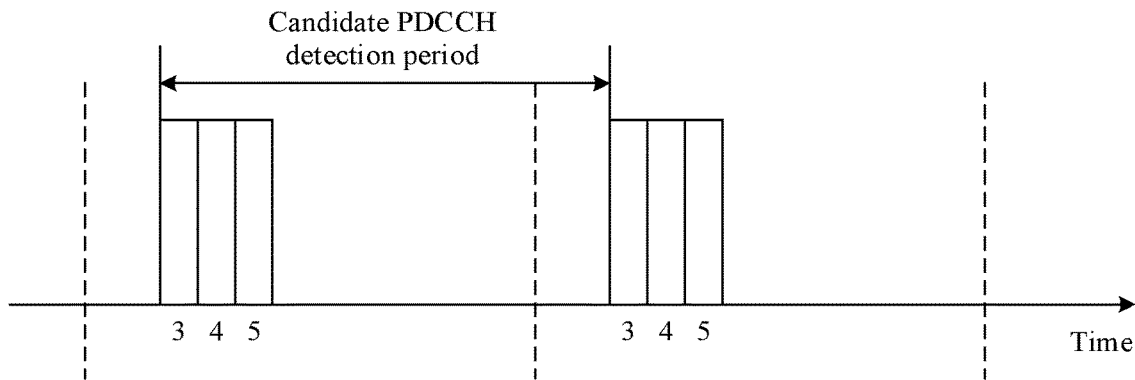
FIG. 3 is a schematic diagram of a period of detecting a candidate PDCCH according to an embodiment of the application.

FIG. 3 may be used as an example to describe a definition of a candidate PDCCH detection period. The part shown in FIG. 3 is included in a DRX cycle. A DRX cycle further includes a state in which a candidate PDCCH is not to be detected. However, because this specification mainly focuses on a state in which a candidate PDCCH is to be detected in a DRX cycle, FIG. 3 shows only a part in a state of detecting a candidate PDCCH in a DRX cycle. For example, the DRX cycle includes two candidate PDCCH detection periods. In one candidate PDCCH detection period, detection starts from, for example, the third slot and ends in the fifth slot. The so-called candidate PDCCH detection period is a time difference between the third slots included in the two candidate PDCCH detection periods. Rectangular boxes represented by 3, 4, and 5 marked in FIG. 3 indicate the third slot to the fifth slot, and the candidate PDCCH detection period is shown in FIG. 3.

In an embodiment of the application, the candidate PDCCH detection period corresponding to the $i^{th}$ configuration parameter set is greater than the candidate PDCCH detection period corresponding to the $(i-1)^{th}$ configuration parameter set. This indicates that a quantity of times of detecting a candidate PDCCH when the terminal device is using the $i^{th}$ configuration parameter set is equal to or less than a quantity of times of detecting a candidate PDCCH when the terminal device is using the $(i-1)^{th}$ configuration parameter set, and power consumption for detecting a candidate PDCCH when the terminal device is using the $(i-1)^{th}$ configuration parameter set may be greater than or equal to power consumption for detecting a candidate PDCCH when the terminal device is using the $i^{th}$ configuration parameter set. In addition, the candidate PDCCH detection period corresponding to the $i^{th}$ configuration parameter set needs to be a multiple of the candidate PDCCH detection period corresponding to the $(i-1)^{th}$ configuration parameter set, so that detection locations corresponding to the $(i-1)^{th}$ configuration parameter set include detection locations corresponding to the $i^{th}$ configuration parameter set. For example, the candidate PDCCH detection period corresponding to the $(i-1)^{th}$ configuration parameter set may be set to 5 ms, and the candidate PDCCH detection period corresponding to the $i^{th}$ configuration parameter set may be set to 10 ms. In this case, when the terminal device is using the $(i-1)^{th}$ configuration parameter set, detection is performed every 5 ms. For example, the detection locations include 1, 6, 11, 16, 21, and the like. When the terminal device is using the $i^{th}$ configuration parameter set, detection is performed every 10 ms. For example, the detection locations include 1, 11, 21, and the like. It can be learned that the detection locations corresponding to the $(i-1)^{th}$ configuration parameter set include the detection locations corresponding to the $i^{th}$ configuration parameter set, so that it is ensured that the candidate PDCCH resource corresponding to the $i^{th}$ configuration parameter set is a subset or a proper subset of the candidate PDCCH resource corresponding to the $(i-1)^{th}$ configuration parameter set. For example, the network device indicates, by using downlink control information, the terminal device to switch from the $(i-1)^{th}$ configuration parameter set in which the candidate PDCCH detection period is 5 ms to the $i^{th}$ configuration parameter set in which the candidate PDCCH detection period is 10 ms. In other words, the network device indicates information about the $i^{th}$ configuration parameter set to the terminal device by using the downlink control information. The terminal device misses the indication of the network device, and the terminal device continues to use 5 ms as a candidate PDCCH detection period. However, the network device sends a PDCCH based on the candidate PDCCH detection period of 10 ms. It can be learned from the foregoing description of the detection locations that the terminal device can still detect the PDCCH sent by the network device, thereby reducing a possibility that the terminal device misses a PDCCH, and improving a success rate of detecting a PDCCH by the terminal device.

2. The time domain resource set for detecting a candidate PDCCH corresponding to the $i^{th}$ configuration parameter set is a subset of the time domain resource set for detecting a candidate PDCCH corresponding to the $(i-1)^{th}$ configuration parameter set.

Time domain resource sets for detecting a candidate PDCCH corresponding to all candidate PDCCH detection periods included in a configuration parameter set are the same. Therefore, the point in 2 may be as follows: A time domain resource set in one candidate PDCCH detection period corresponding to the $i^{th}$ configuration parameter set is a subset of a time domain resource set in the same candidate PDCCH detection period corresponding to the $(i-1)^{th}$ configuration parameter set. As long as a time domain resource set in one candidate PDCCH detection period meets the condition, it can be ensured that the time domain resource set for detecting a candidate PDCCH corresponding to the $i^{th}$ configuration parameter set is a subset, for example, a proper subset, of the time domain resource set for detecting a candidate PDCCH corresponding to the $(i-1)^{th}$ configuration parameter set.

A time domain resource set in a candidate PDCCH detection period corresponding to a configuration parameter set may be determined based on parameters such as the candidate PDCCH detection period, an offset, and duration. For example, reference may continue to be made to FIG. 3 for understanding. FIG. 3 includes two candidate PDCCH detection periods. The first candidate PDCCH detection period is used as an example. In the first candidate PDCCH detection period, detection starts from the third slot and ends in the fifth slot, that is, an offset is two slots, duration is three slots, and a time domain resource set within the candidate PDCCH detection period is the slot 3 to the slot 5. For all candidate PDCCH detection periods corresponding to a same configuration parameter set, time domain resource sets are the same. Certainly, in FIG. 3, a slot is used as a granularity. A granularity may be finer for a time domain resource set. For example, a time domain symbol may be used as a granularity, that is, a time domain resource set in a candidate PDCCH detection period corresponding to a configuration parameter set may be determined based on parameters such as the candidate PDCCH detection period, an offset, duration, and a pattern in a slot. The pattern in a slot indicates a time domain symbol on which a candidate PDCCH is detected in the slot. A time domain symbol is, for example, an orthogonal frequency division multiplexing (OFDM) symbol, or may be another time domain symbol.

For example, on the basis of FIG. 3, the first candidate PDCCH detection period in FIG. 3 is used as an example. In the first candidate PDCCH detection period, detection starts from the third slot and ends in the fifth slot. In each slot, detection starts from the second time domain symbol and ends at the last time domain symbol. For example, if one slot includes 12 time domain symbols, a time domain resource set in the candidate PDCCH detection period is time domain symbols 1 to 11 in the third slot, time domain symbols 1 to 11 in the fourth slot, and time domain symbols 1 to 11 in the fifth slot. Likewise, for all candidate PDCCH detection periods corresponding to a same configuration parameter set, time domain resource sets are the same.

In an embodiment of the application, a time domain resource set in a candidate PDCCH detection period corresponding to the $i^{th}$ configuration parameter set is a subset of a time domain resource set in a candidate PDCCH detection period corresponding to the $(i-1)^{th}$ configuration parameter set. This indicates that time domain resources for detecting a candidate PDCCH when the terminal device is using the $i^{th}$ configuration parameter set is equal to or less than time domain resources for detecting a candidate PDCCH when the terminal device is using the $(i-1)^{th}$ configuration parameter set, and power consumption for detecting a candidate PDCCH when the terminal device is using the $(i-1)^{th}$ configuration parameter set may be greater than or equal to power consumption for detecting a candidate PDCCH when the terminal device is using the $i^{th}$ configuration parameter set.

For example, referring to FIG. 3, a time domain resource set in a candidate PDCCH detection period corresponding to the $(i-1)^{th}$ configuration parameter set is set to slots 3 to 5, and a time domain resource set in a candidate PDCCH detection period corresponding to the $i^{th}$ configuration parameter set is set to slots 4 and 5. It can be learned that detection locations corresponding to the $(i-1)^{th}$ configuration parameter set include detection locations corresponding to the $i^{th}$ configuration parameter set, so that it is ensured that the candidate PDCCH resource corresponding to the $i^{th}$ configuration parameter set is a subset of the candidate PDCCH resource corresponding to the $(i-1)^{th}$ configuration parameter set. For example, the network device indicates, by using downlink control information, the terminal device to switch from the $(i-1)^{th}$ configuration parameter set to the $i^{th}$ configuration parameter set. In other words, the network device indicates information about the $i^{th}$ configuration parameter set to the terminal device by using the downlink control information. The time domain resource set in the candidate PDCCH detection period corresponding to the $(i-1)^{th}$ configuration parameter set is slots 3 to 5, and the time domain resource set in the candidate PDCCH detection period corresponding to the $i^{th}$ configuration parameter set is slots 4 and 5. The terminal device misses the indication of the network device, and the terminal device continues to perform detection by using the $(i-1)^{th}$ configuration parameter set. However, the network device sends a PDCCH by using the $i^{th}$ configuration parameter set. It can be learned from the foregoing description of the detection locations that the terminal device can still detect the PDCCH sent by the network device, thereby reducing a possibility that the terminal device misses a PDCCH, and improving a success rate of detecting a PDCCH by the terminal device.

For example, referring to FIG. 3, a time domain resource set in a candidate PDCCH detection period corresponding to the $(i-1)^{th}$ configuration parameter set is set to time domain symbols 1 to 11 in slot 3, time domain symbols 1 to 11 in slot 4, and time domain symbols 1 to 11 in slot 5, and a time domain resource set in a candidate PDCCH detection period corresponding to the $i^{th}$ configuration parameter set is set to time domain symbols 2 to 11 in slot 3, time domain symbols 2 to 11 in slot 4, and time domain symbols 2 to 11 in slot 5. It can be learned that detection locations corresponding to the $(i-1)^{th}$ configuration parameter set still include detection locations corresponding to the $i^{th}$ configuration parameter set, so that it is ensured that the candidate PDCCH resource corresponding to the $i^{th}$ configuration parameter set is a subset or a proper subset of the candidate PDCCH resource corresponding to the $(i-1)^{th}$ configuration parameter set. When the network device indicates, by using downlink control information, the terminal device to switch from the $(i-1)^{th}$ configuration parameter set to the $i^{th}$ configuration parameter set, that is, the network device indicates information about the $i^{th}$ configuration parameter set to the terminal device by using downlink control information, even if the terminal device misses the indication of the network device, the terminal device continues to perform detection by using the $(i-1)^{th}$ configuration parameter set, and the network device sends a PDCCH by using the $i^{th}$ configuration parameter set, it can be learned from the foregoing description that the terminal device can still detect the PDCCH sent by the network device, thereby reducing a possibility that the terminal device misses a PDCCH, and improving a success rate of detecting a PDCCH by the terminal device.

3. The set of candidate PDCCHs of the search space corresponding to the $i^{th}$ configuration parameter set is a subset of the set of candidate PDCCHs of the search space corresponding to the $(i-1)^{th}$ configuration parameter set.

A configuration parameter set corresponds to a corresponding search space, and the search space corresponds to a set of candidate PDCCHs.

A set of candidate PDCCHs of a search space corresponding to a configuration parameter set may be understood as a quantity of candidate PDCCHs at at least one aggregation level corresponding to the configuration parameter set. For example, a quantity of candidate PDCCHs whose aggregation levels are one control channel element (CCE) in a given slot of the terminal device is 4M; in this case, quantities of candidate PDCCHs whose aggregation levels are one control channel element and that are corresponding to the N configuration parameter sets may be respectively 4M, 2M, and M. Alternatively, a quantity of candidate PDCCHs whose aggregation levels are two CCEs in a given slot of the terminal device is 4P; in this case, quantities of candidate PDCCHs whose aggregation levels are one control channel element and that are corresponding to the N configuration parameter sets may be respectively 4P, 2P, and P. If configuration is performed based on a quantity of times of blind detection on a candidate PDCCH, it should be noted that a quantity of candidate PDCCHs corresponding to all search spaces of one terminal device is a maximum quantity of times of blind detection on a candidate PDCCH of the terminal device. A search space corresponding to a maximum quantity of times of blind detection on a candidate PDCCH that is configured for the set of candidate PDCCHs corresponding to the $i^{th}$ configuration parameter set needs to be a subset, for example, a proper subset, of a search space corresponding to a maximum quantity of times of blind detection on a candidate PDCCH that is configured for the set of candidate PDCCHs corresponding to the $(i-1)^{th}$ configuration parameter set. If a maximum quantity of times of blind detection on a candidate PDCCH is 4M, two 2M times of blind detection on a candidate PDCCH are included, which may be understood as including search spaces respectively corresponding to two 2M times of blind detection on a candidate PDCCH, that is, two search spaces. If a maximum quantity of times of blind detection on a candidate PDCCH that is configured for the candidate PDCCH corresponding to the $(i-1)^{th}$ configuration parameter set is 2M, a search space corresponding to the 2M times of blind detection on a candidate PDCCH is the first search space in the two search spaces, a maximum quantity of times of blind detection on a candidate PDCCH that is configured for the candidate PDCCH corresponding to the $i^{th}$ configuration parameter set is M, and a search space corresponding to the M times of blind detection that is configured for the $i^{th}$ configuration parameter set is the second search space in the two search spaces, it is clear that the search space corresponding to the maximum quantity of times of blind detection on a candidate PDCCH configured for the candidate PDCCH corresponding to the $i^{th}$ configuration parameter set is not a subset or a proper subset of the search space corresponding to the maximum quantity of times of blind detection on a candidate PDCCH configured for the candidate PDCCH corresponding to the $(i-1)^{th}$ configuration parameter set. In this case, it is clear that the candidate PDCCH resource corresponding to the $i^{th}$ configuration parameter set is not a subset or a proper subset of the candidate PDCCH resource corresponding to the $(i-1)^{th}$ configuration parameter set, and consequently an objective of nesting the configuration parameter sets cannot be achieved. Therefore, if the maximum quantity of times of blind detection on a candidate PDCCH that is configured for the candidate PDCCH corresponding to the $(i-1)^{th}$ configuration parameter set is 2M, the search space corresponding to the 2M times of blind detection on a candidate PDCCH is the first search space in the two search spaces, and the maximum quantity of times of blind detection on a candidate PDCCH that is configured for the candidate PDCCH corresponding to the $i^{th}$ configuration parameter set is M, the search space corresponding to the M times of blind detection that is configured for the candidate PDCCH corresponding to the $i^{th}$ configuration parameter set needs to be the first search space in the two search spaces. In this way, it can be ensured that the candidate PDCCH resource corresponding to the $i^{th}$ configuration parameter set is a subset or a proper subset of the candidate PDCCH resource corresponding to the $(i-1)^{th}$ configuration parameter set, so as to achieve an objective of nesting the configuration parameter sets.

For example, the network device indicates, by using downlink control information, the terminal device to switch from the $(i-1)^{th}$ configuration parameter set to the $i^{th}$ configuration parameter set. In other words, the network device indicates information about the $i^{th}$ configuration parameter set to the terminal device by using the downlink control information. The search space corresponding to the $(i-1)^{th}$ configuration parameter set is a search space 1, the search space corresponding to the $i^{th}$ configuration parameter set is a search space 2, and the search space 2 is a proper subset of the search space 1. The terminal device misses the indication of the network device, and the terminal device continues to perform detection by using the $(i-1)^{th}$ configuration parameter set. However, the network device sends a PDCCH by using the $i^{th}$ configuration parameter set. It can be learned from the foregoing description that the terminal device continues to detect a candidate PDCCH in the search space 1, and the network device sends a PDCCH in the search space 2, and because the search space 2 is a proper subset of the search space 1, the terminal device can still detect the PDCCH sent by the network device, thereby reducing a possibility that the terminal device misses a PDCCH, and improving a success rate of detecting a PDCCH by the terminal device.

4. The control resource set of a candidate PDCCH corresponding to the $i^{th}$ configuration parameter set is a subset of a control resource set of a candidate PDCCH corresponding to the $(i-1)^{th}$ configuration parameter set.

The search space in point 3 is a logical concept, and point 4 is described from a perspective of a physical resource.

A candidate PDCCH corresponding to a configuration parameter set may correspond to one or more control resource sets. In other words, one or more control resource sets may be configured for a candidate PDCCH corresponding to a configuration parameter set. In an embodiment of the application, the control resource set of the candidate PDCCH corresponding to the $i^{th}$ configuration parameter set is a subset, for example, a proper subset, of the control resource set of the candidate PDCCH corresponding to the $(i-1)^{th}$ configuration parameter set. For example, the control resource set configured for the candidate PDCCH corresponding to the $(i-1)^{th}$ configuration parameter set is a control resource set 1 and a control resource set 2, and the control resource set configured for the candidate PDCCH corresponding to the $i^{th}$ configuration parameter set may be the control resource set 1, or the control resource set 2, or the control resource set 1 and the control resource set 2.

For example, the network device indicates, by using downlink control information, the terminal device to switch from the $(i-1)^{th}$ configuration parameter set to the $i^{th}$ configuration parameter set. In other words, the network device indicates information about the $i^{th}$ configuration parameter set to the terminal device by using the downlink control information. The control resource set for the candidate PDCCH corresponding to the $(i-1)^{th}$ configuration parameter set is the control resource set 1 and the control resource set 2, and the control resource set for the candidate PDCCH corresponding to the $i^{th}$ configuration parameter set is, for example, the control resource set 2. The terminal device misses the indication of the network device, and the terminal device continues to perform detection by using the $(i-1)^{th}$ configuration parameter set. However, the network device sends a PDCCH by using the $i^{th}$ configuration parameter set. It can be learned from the foregoing description that the terminal device continues to detect a candidate PDCCH in the control resource set 1 and the control resource set 2, and the network device sends a PDCCH in the control resource set 2, and because the detection range of the terminal device includes the control resource set 2, the terminal device can still detect the PDCCH sent by the network device, thereby reducing a possibility that the terminal device misses a PDCCH, and improving a success rate of detecting a PDCCH by the terminal device.

5. The set of candidate PDCCHs of the search space corresponding to the BWP corresponding to the $i^{th}$ configuration parameter set is a subset of the set of candidate PDCCHs of the search space corresponding to the BWP corresponding to the $(i-1)^{th}$ configuration parameter set.

For the BWP, nesting may not be required. In other words, it may not be required that the BWP corresponding to the $i^{th}$ configuration parameter set is a subset of the BWP corresponding to the $(i-1)^{th}$ configuration parameter set. However, the terminal device may perform BWP switching in a working process. For example, the terminal device originally works on a BWP 1, and a configuration parameter set used by the terminal device is the $(i-1)^{th}$ configuration parameter set. The network device indicates, by using downlink control information on the BWP 1, the terminal device to switch from the $(i-1)^{th}$ configuration parameter set to the $i^{th}$ configuration parameter set. In other words, the network device indicates, to the terminal device by using downlink control information, information about the $i^{th}$ configuration parameter set. The terminal device performs BWP switching from the BWP 1 to a BWP 2. Due to BWP switching, the terminal device may miss a PDCCH that is sent by the network device on the BWP 1 and that is used to indicate to switch the configuration parameter set. In this case, the terminal device continues to perform detection on the BWP 2 by using the $(i-1)^{th}$ configuration parameter set, but the network device sends a PDCCH on the BWP 2 based on the $i^{th}$ configuration parameter set. Consequently, miss detection may be caused. Therefore, to reduce a possibility that the terminal device misses a PDCCH in this case, the set of candidate PDCCHs of the search space corresponding to the BWP corresponding to the $i^{th}$ configuration parameter set may be configured to be a subset of the set of candidate PDCCHs of the search space corresponding to the BWP corresponding to the $(i-1)^{th}$ configuration parameter set. If the foregoing example continues to be used, a set of candidate PDCCHs of a search space corresponding to the BWP 2 corresponding to the $i^{th}$ configuration parameter set is configured to be a subset, for example, a proper subset, of a set of candidate PDCCHs of a search space corresponding to the BWP 1 corresponding to the $(i-1)^{th}$ configuration parameter set. In this case, even if the terminal device misses the PDCCH that is sent by the network device and that is used to indicate to switch the configuration parameter set, the terminal device continues to detect a candidate PDCCH by using the $(i-1)^{th}$ configuration parameter set in the BWP 2, and the network device sends a PDCCH by using the $i^{th}$ configuration parameter set in the BWP2, it can be learned from the foregoing description that the search space of the candidate PDCCH corresponding to the BWP 2 is a subset or a proper subset of the search space of the candidate PDCCH corresponding to the BWP 1. Therefore, the terminal device still detects the PDCCH sent by the network device, thereby reducing a possibility that the terminal device misses a PDCCH, and improving a success rate of detecting a PDCCH by the terminal device.

A set of candidate PDCCHs of a search space corresponding to a configuration parameter set may be understood as a quantity of candidate PDCCHs at at least one aggregation level corresponding to the configuration parameter set. For example, a quantity of candidate PDCCHs whose aggregation levels are one CCE in a given slot of the terminal device is 4M; in this case, quantities of candidate PDCCHs whose aggregation levels are one control channel element and that are corresponding to the N configuration parameter sets may be respectively 4M, 2M, and M. Alternatively, a quantity of candidate PDCCHs whose aggregation levels are two CCEs in a given slot of the terminal device is 4P; in this case, quantities of candidate PDCCHs whose aggregation levels are one control channel element and that are corresponding to the N configuration parameter sets may be respectively 4P, 2P, and P. If configuration is performed based on a quantity of times of blind detection on a candidate PDCCH, it should be noted that a quantity of candidate PDCCHs corresponding to all search spaces of one terminal device is a maximum quantity of times of blind detection on a candidate PDCCH of the terminal device. A search space corresponding to a maximum quantity of times of blind detection on a candidate PDCCH that is configured for the set of candidate PDCCHs corresponding to the $i^{th}$ configuration parameter set needs to be a subset, for example, a proper subset, of a search space corresponding to a maximum quantity of times of blind detection on a candidate PDCCH that is configured for the set of candidate PDCCHs corresponding to the $(i-1)^{th}$ configuration parameter set. For details about this part, see point 3 in the foregoing description.

6. The control resource set of a candidate PDCCH corresponding to the BWP corresponding to the $i^{th}$ configuration parameter set is a subset of the control resource set of a candidate PDCCH corresponding to the BWP corresponding to the $(i-1)^{th}$ configuration parameter set.

It can be learned from the description of the fifth point that although nesting is not required for the BWP, to reduce a possibility that the terminal device misses a PDCCH, the BWP still needs to be limited. In the fifth point, the set of candidate PDCCHs of the search space corresponding to the BWP corresponding to the $i^{th}$ configuration parameter set is configured to be a subset of the set of candidate PDCCHs of the search space corresponding to the BWP corresponding to the $(i-1)^{th}$ configuration parameter set. In the sixth point, the control resource set of a candidate PDCCH corresponding to the BWP corresponding to the $i^{th}$ configuration parameter set is configured to be a subset, for example, a proper subset, of the control resource set of a candidate PDCCH corresponding to the BWP corresponding to the $(i-1)^{th}$ configuration parameter set.

For example, the terminal device originally works on a BWP 1, and a configuration parameter set used by the terminal device is the $(i-1)^{th}$ configuration parameter set. The network device indicates, by using downlink control information on the BWP 1, the terminal device to switch from the $(i-1)^{th}$ configuration parameter set to the $i^{th}$ configuration parameter set. In other words, the network device indicates, to the terminal device by using downlink control information, information about the $i^{th}$ configuration parameter set. The terminal device performs BWP switching from the BWP 1 to a BWP 2. Due to BWP switching, the terminal device misses a PDCCH that is sent by the network device on the BWP 1 and that is used to indicate to switch the configuration parameter set. In this case, the terminal device continues to detect a candidate PDCCH on the BWP 2 by using the $(i-1)^{th}$ configuration parameter set, but the network device sends a PDCCH on the BWP 2 based on the $i^{th}$ configuration parameter set. In an embodiment of the application, a control resource set of a candidate PDCCH corresponding to the BWP 2 corresponding to the $i^{th}$ configuration parameter set is configured to be a subset or a proper subset of a control resource set of a candidate PDCCH corresponding to the BWP 1 corresponding to the $(i-1)^{th}$ configuration parameter set. In this case, even if the terminal device misses the PDCCH that is sent by the network device and that is used to indicate to switch the configuration parameter set, the terminal device continues to detect a candidate PDCCH by using the $(i-1)^{th}$ configuration parameter set in the BWP 2, and the network device sends a PDCCH by using the $i^{th}$ configuration parameter set in the BWP2, it can be learned from the foregoing description that the control resource set of a candidate PDCCH corresponding to the BWP 2 is a subset of the control resource set of a candidate PDCCH corresponding to the BWP 1. Therefore, the terminal device still detects the PDCCH sent by the network device, thereby reducing a possibility that the terminal device misses a PDCCH, and improving a success rate of detecting a PDCCH by the terminal device.

It should be noted that descriptions of the foregoing parameters are only examples. In an embodiment of the application, the candidate PDCCH resource corresponding to the $i^{th}$ configuration parameter set in the N configuration parameter sets needs to be a subset of the candidate PDCCH resource corresponding to the $(i-1)^{th}$ configuration parameter set, and parameters used for implementation are not limited. For example, the method may be implemented by using one or more parameters described above, or may be implemented by using one or more parameters described above and with reference to another parameter, or may be implemented by using another parameter instead of the parameters described above. This is not limited in an embodiment of the application.

S24. The network device sends notification information, and the terminal device receives the notification information, where the notification information is used to indicate a configuration parameter set.

In an embodiment of the application, the notification information may be implemented in different manners.

In a first implementation of the notification information, the notification information may be implemented by using downlink control information. For example, the notification information may be implemented as first downlink control information, and the first downlink control information is used to indicate a first configuration parameter set in the N configuration parameter sets. For example, a configuration parameter set used when the terminal device detects the first downlink control information is a second configuration parameter set in the N configuration parameter sets. If the first configuration parameter set is different from the second configuration parameter set, it may be understood that the first downlink control information is information used to indicate the terminal device to switch between configuration parameter sets. If the first configuration parameter set is the same as the second configuration parameter set, it may be understood as: The first downlink control information is information that indicates the terminal device not to switch between configuration parameter sets.

When the notification information is implemented by using the first downlink control information, the configuration parameter sets included in the N configuration parameter sets need to be set in a nesting manner based on the foregoing description, and when the network device indicates the terminal device to switch a configuration parameter set, it is required that a candidate PDCCH resource corresponding to a configuration parameter set used after the switching is a subset of a candidate PDCCH resource corresponding to a configuration parameter set used before the switching, which may be understood as: power consumption that is for detecting a candidate PDCCH by the terminal device and that is corresponding to the configuration parameter set used after the switching needs to be less than power consumption that is for detecting a candidate PDCCH by the terminal device and that is corresponding to the configuration parameter set used before the switching. If the configuration parameter sets included in the N configuration parameter sets are sorted in descending order of corresponding power consumption for detecting a candidate PDCCH by the terminal device, it may be understood as: A location of the configuration parameter set used after switching in the sequence needs to be located after a location of the configuration parameter set used before switching in the sequence. An interval between the configuration parameter set used after switching and the configuration parameter set used before switching in the sequence is not limited in an embodiment of the application. For example, in the sequence, the configuration parameter set used after switching and the configuration parameter set used before switching are adjacent configuration parameter sets, or in the sequence, there is another configuration parameter set between the configuration parameter set used after switching and the configuration parameter set used before switching.

For example, the first downlink control information may be downlink control information dedicated to the terminal device, that is, downlink control information based on the terminal device. The first downlink control information may include one or more bits, and the one or more bits are used to indicate a configuration parameter set. In this case, when sending the first downlink control information, the network device may send the first downlink control information to a corresponding terminal device in a unicast manner, so that the terminal device determines, based on the first downlink control information, the configuration parameter set used after switching, or determines not to switch a configuration parameter set. The configuration parameter set of the terminal device is indicated by using the dedicated downlink control information of the terminal device, so that the indication can be clearer.

Alternatively, when the notification information is implemented by using downlink control information, for example, the notification information may be further implemented as second downlink control information.

The second downlink control information may be downlink control information based on a terminal device group. For example, the second downlink control information may include at least one piece of indication information, and each piece of indication information is used to indicate a configuration parameter set of one or more terminal devices in the terminal device group. For example, each piece of indication information in the at least one piece of indication information may be used to indicate a configuration parameter set of one terminal device. For example, one piece of indication information in the at least one piece of indication information may be used to indicate an index of a configuration parameter set for a terminal device. Alternatively, each of the at least one piece of indication information may be used to indicate configuration parameter sets of a plurality of terminal devices. That one piece of indication information in the at least one piece of indication information indicates configuration parameter sets of three terminal devices is used as an example. When an index of a configuration parameter set indicated by one piece of indication information in the at least one piece of indication information is 3, it indicates that indexes of corresponding configuration parameter sets of the three terminal devices are all 3. If each of the at least one piece of indication information is used to indicate configuration parameter sets of a plurality of terminal devices, quantities of terminal devices indicated by different pieces of indication information in the at least one piece of indication information may be the same. For example, each piece of indication information indicates configuration parameter sets of two terminal devices. Alternatively, quantities of terminal devices indicated by different pieces of indication information in the at least one piece of indication information may be different. For example, in the at least one piece of indication information, a quantity of terminal devices indicated by one piece of indication information is 2, and a quantity of terminal devices indicated by another piece of indication information is 3. A quantity of terminal devices indicated by each of the at least one piece of indication information is not limited in an embodiment of the application.

A terminal device in the terminal device group knows in advance which indication information in the at least one piece of indication information corresponds to the terminal device. Therefore, the network device may send the second downlink control information in a multicast or broadcast manner. After the terminal device in the terminal device group receives the second downlink control information, the terminal device may determine, based on indication information corresponding to the terminal device in the at least one piece of indication information included in the second downlink control information, a configuration parameter set used after switching, or determine not to switch a configuration parameter set. For example, a terminal device in the terminal device group is corresponding to first indication information in the at least one piece of indication information included in the second downlink control information. After receiving the second downlink control information, the terminal device may determine, based on the first indication information, a configuration parameter set used after switching, or determine not to switch a configuration parameter set. In this way, the configuration parameter sets of the plurality of terminal devices can be indicated by sending one piece of second downlink control information, thereby helping save transmission resources.

For example, the terminal device group includes P terminal devices, the second downlink control information based on the terminal device group may include K×P information bits, both K and P are positive integers, and the K×P information bits can be used to indicate configuration parameter sets of the P terminal devices. If K=1, each terminal device is corresponding to one information bit in the second downlink control information. If a value of the information bit is "1", it indicates that the terminal device works by using a next configuration parameter set in the sequence of the N configuration parameter sets; if a value of the information bit is "0", it indicates that the terminal device does not change a configuration parameter set. In other words, the information bit does not explicitly indicate information about a configuration parameter set, and if switching is required, the terminal device is merely indicated to perform switching according to an order in the sequence formed after the N configuration parameter sets are nested, for example, switching is performed in an order from high power consumption for detecting a candidate PDCCH by the terminal device to low power consumption for detecting a candidate PDCCH by the terminal device. For example, the N configuration parameter sets configured by the network device for the terminal device include four configuration parameter sets, which are respectively a configuration parameter set 1 to a configuration parameter set 4, and are sorted based on power consumption that is for detecting a candidate PDCCH by the terminal device and that is corresponding to the configuration parameter sets. The sequence is: the configuration parameter set 1>the configuration parameter set 2>the configuration parameter set 3>the configuration parameter set 4. When the terminal device works by using the configuration parameter set 1, if the second downlink control information is received, and a value of indication information corresponding to the terminal device in the second downlink control information is "1", the terminal device determines to switch from the configuration parameter set 1 to the configuration parameter set 2. However, if a value of indication information corresponding to the terminal device in the second downlink control information is "0", the terminal device determines to maintain the configuration parameter set 1 unchanged. Herein, K=1 is used as an example. If K>1, each terminal device may be corresponding to K information bits in the second downlink control information, and the K information bits may be corresponding to a maximum of 2K configuration parameter sets, so that the network device can perform indication more flexibly.

When the notification information is implemented by using the second downlink control information, a candidate PDCCH resource corresponding to the configuration parameter set used after switching needs to be a subset of a candidate PDCCH resource corresponding to the configuration parameter set used before switching. For example, the configuration parameter set used after switching is the first configuration parameter set, the configuration parameter set used before switching is the second configuration parameter set. That is, a candidate PDCCH resource corresponding to the first configuration parameter set needs to be a subset of a candidate PDCCH resource corresponding to the second configuration parameter set. In this case, a combination of the first configuration parameter set and the second configuration parameter set does not include one or more of the following:

a candidate PDCCH detection period corresponding to the second configuration parameter set is greater than a candidate PDCCH detection period corresponding to the first configuration parameter set; or a candidate PDCCH detection period corresponding to the first configuration parameter set is not an integer multiple of a candidate PDCCH detection period corresponding to the second configuration parameter set; or a candidate PDCCH detection period corresponding to the second configuration parameter set is greater than a candidate PDCCH detection period corresponding to the first configuration parameter set, and the candidate PDCCH detection period corresponding to the first configuration parameter set is not an integer multiple of the candidate PDCCH detection period corresponding to the second configuration parameter set;

a time domain resource set for detecting a candidate PDCCH corresponding to the first configuration parameter set is not a subset of a time domain resource set for detecting a candidate PDCCH corresponding to the second configuration parameter set;

a set of candidate PDCCHs of a search space corresponding to the first configuration parameter set is not a subset of a set of candidate PDCCHs of a search space corresponding to the second configuration parameter set;

a control resource set of a candidate PDCCH corresponding to the first configuration parameter set is not a subset of a control resource set of a candidate PDCCH corresponding to the second configuration parameter set;

a set of candidate PDCCHs of a search space corresponding to a bandwidth part corresponding to the first configuration parameter set is not a subset of a set of candidate PDCCHs of a search space corresponding to a bandwidth part corresponding to the second configuration parameter set; and a control resource set of a candidate PDCCH corresponding to a bandwidth part corresponding to the first configuration parameter set is not a subset of a control resource set of a candidate PDCCH corresponding to a bandwidth part corresponding to the second configuration parameter set.

None of the foregoing cases meets the condition that the candidate PDCCH resource corresponding to the configuration parameter set used after switching is a subset or a proper subset of the candidate PDCCH resource corresponding to the configuration parameter set used before switching. Therefore, if the notification information is implemented by using the first downlink control information, the combination of the first configuration parameter set and the second configuration parameter set does not include one or more of the foregoing cases.

In a second implementation of the notification information, the notification information may be carried in a media access control control element (MAC CE). In other words, the notification information is implemented by using a MAC CE. For example, the notification information may be carried in a MAC CE field of downlink data, and the MAC CE field may be located in a MAC layer header of the downlink data. Because the MAC CE is carried on a physical downlink shared channel (PDSCH), after the network device sends the MAC CE, the terminal device returns acknowledgment information of a physical layer to the network device. This handshake communication mechanism can basically ensure that the network device determines whether the terminal device misses the MAC CE. Therefore, it can be basically ensured that the network device and the terminal device work based on a same configuration parameter set. Therefore, if the notification information is carried in the MAC CE, a setting manner of the N configuration parameter sets may not be limited. The N configuration parameter sets may be set in a nested manner according to the foregoing description, or may be set in another manner instead of the nested manner. In addition, when indicating the terminal device to switch a configuration parameter set, the network device does not need to enable a candidate PDCCH resource corresponding to the configuration parameter set used after switching to be a subset of a candidate PDCCH resource corresponding to the configuration parameter set used before switching. In other words, there is no need to limit the configuration parameter set used after switching, the candidate PDCCH resource corresponding to the configuration parameter set used after switching may be a subset of the candidate PDCCH resource corresponding to the configuration parameter set used before switching, or the candidate PDCCH resource corresponding to the configuration parameter set used after switching may not be a subset of the candidate PDCCH resource corresponding to the configuration parameter set used before switching.

For example, a protocol or the network device may preconfigure at least one MAC CE, and a quantity of the at least one MAC CE may be equal to a quantity of configuration parameter sets included in the N configuration parameter sets. In other words, the MAC CEs are in a one-to-one correspondence with the configuration parameter sets included in the N configuration parameter sets, and one MAC CE represents one configuration parameter set. In this case, a MAC CE sent by the network device indicates a configuration parameter set to which the terminal device is indicated to switch the configuration parameter set. In other words, the MAC CE sent by the network device indicates a configuration parameter set used after switching. Alternatively, the network device may indicate, by using one MAC CE, the terminal device to switch a configuration parameter set. The one MAC CE may indicate information about a configuration parameter set used after switching. In this case, after the network device sends the MAC CE, the terminal device may switch to the configuration parameter set that is set by default, for example, the configuration parameter set that is set by default is preset by the network device or a protocol. Alternatively, the network device may indicate, by using one MAC CE and a payload of the MAC CE, the terminal device to switch a configuration parameter set. For example, the network device may indicate, by using one MAC CE, the terminal device to switch a configuration parameter set, and may use a payload of the MAC CE to carry information about a configuration parameter set used after switching. In this case, after receiving the MAC CE, the terminal device determines, based on the MAC CE, to switch the configuration parameter set, and may determine, based on the payload of the MAC CE, a configuration parameter set to which the terminal device needs to switch.

S25. The terminal device switches from the second configuration parameter set to the first configuration parameter set.

For example, the notification information indicates the information about the first configuration parameter set to the terminal device, and the first configuration parameter set is different from the second configuration parameter set. In this case, the terminal device switches from the second configuration parameter set to the first configuration parameter set. If the first configuration parameter set is the same as the second configuration parameter set, the terminal device continues to maintain the current configuration parameter set. "maintain" may be understood as the following: The terminal device performs S25, or because the first configuration parameter set is the same as the second configuration parameter set, the terminal device does not perform S25.

Certainly, S25 is performed only when the terminal device receives the notification information. If the terminal device does not receive the notification information, the terminal device does not perform S25, and does not switch the configuration parameter set. For example, the terminal device maintains the second configuration parameter set. In this case, if the notification information is carried by using a MAC CE, the terminal device does not return response information to the network device, and the network device does not receive the response information sent by the terminal device. In this case, the network device may not adjust the configuration parameter set, and maintain a configuration parameter set that is the same as that of the terminal device. If the notification information is the first downlink control information or the second downlink control information, the network device switches the configuration parameter set, for example, switches from the second configuration parameter set to the first configuration parameter set. According to the foregoing description, the candidate PDCCH resource corresponding to the first configuration parameter set is a subset of the candidate PDCCH resource corresponding to the second configuration parameter set. Therefore, although the terminal device continues to perform blind detection on a candidate PDCCH based on the second configuration parameter set, the terminal device can still detect a PDCCH sent by the network device based on the first configuration parameter set, thereby reducing a possibility that the terminal device misses a PDCCH.

Certainly, if the terminal device needs to switch the configuration parameter set, it is difficult to ensure that the terminal device and the network device always maintain a same cognition of the configuration parameter set. In other words, it is difficult to ensure that the terminal device and the network device always maintain a same configuration parameter set. For example, when a state in which a candidate PDCCH is to be detected included in a DRX cycle ends, the terminal device may keep using the configuration parameter set 1, but the network device may understand that the terminal device keeps using the configuration parameter set 2. In this case, when a state in which a candidate PDCCH is to be detected included in a next DRX cycle starts, the network device sends a PDCCH based on the configuration parameter set 2, but the terminal device detects a candidate PDCCH based on the configuration parameter set 1. As a result, a sending behavior of the network device is inconsistent with a detection behavior of the terminal device. Particularly, according to the technical solution provided in an embodiment of the application, when the terminal device performs state switching, a candidate PDCCH resource corresponding to a configuration parameter set used after switching may be a subset of a candidate PDCCH resource corresponding to a configuration parameter set used before switching. If the terminal device actually switches to the configuration parameter set 2, but the network device considers that the terminal device still stays in the configuration parameter set 1, and the candidate PDCCH resource corresponding to the configuration parameter set 2 is a subset of the candidate PDCCH resource corresponding to the configuration parameter set 1, the network device sends a PDCCH on the candidate PDCCH resource corresponding to the configuration parameter set 1, but the terminal device blindly detects a candidate PDCCH on the candidate PDCCH resource corresponding to the configuration parameter set 2. Consequently, the terminal device misses the PDCCH.

In view of this, to enable the network device and the terminal device to automatically rectify the cognitive error, an embodiment of the application further proposes that the terminal device automatically enters a third configuration parameter set when the terminal device changes from a state in which a candidate PDCCH is not to be detected to a state in which a candidate PDCCH is to be detected, or in other words, when the terminal device enters, from a slot in which a candidate PDCCH is not to be detected, a slot in which a candidate PDCCH is to be detected, or in other words, in one or more slots in which the terminal device starts to detect a candidate PDCCH in an $a^{th}$ DRX cycle; when entering a state in which a candidate PDCCH is to be detected in a next DRX cycle after a previous DRX cycle ends, the terminal device automatically enters the third configuration parameter set. Likewise, the network device sends a PDCCH on a candidate PDCCH resource corresponding to the third configuration parameter set when the terminal device enters, from the slot in which a candidate PDCCH is not to be detected, the slot in which a candidate PDCCH is to be detected, or in the one or more slots in which the terminal device starts to detect a candidate PDCCH in the $a^{th}$ DRX cycle. In other words, regardless of whether the terminal device receives, in the previous DRX cycle, an instruction that the terminal device is required to be switched to the third configuration parameter set, the terminal device automatically enters the third configuration parameter set when entering the state in which a candidate PDCCH is to be detected in the next DRX cycle. The same is true for the network device. When it is determined that the terminal device enters, from the slot in which a candidate PDCCH is not to be detected, the slot in which a candidate PDCCH is to be detected, or in the one or more slots in which the terminal device starts to detect a candidate PDCCH in the $a^{th}$ DRX cycle, the network device sends a PDCCH on the candidate PDCCH resource corresponding to the third configuration parameter set. In this way, at the beginning of each DRX cycle, configuration parameter sets of the network device and the terminal device are always consistent.

The third configuration parameter set may be a configuration parameter set in the N configuration parameter sets. For example, the third configuration parameter set may be the configuration parameter set configured by using the at least one second message, that is, the configuration parameter set configured by the network device for the terminal device in the prior art. In the prior art, power consumption that is for detecting a candidate PDCCH by the terminal device and that is corresponding to the configuration parameter set configured by the network device for the terminal device is usually relatively high. Therefore, the terminal device entering such a configuration parameter set at the beginning of each DRX cycle helps fully detect a candidate PDCCH. In addition, if the terminal device needs to switch, according to the solution provided in an embodiment of the application, only from a state with high power consumption for detecting a candidate PDCCH to a state with low power consumption for detecting a candidate PDCCH during state switching, the terminal device entering, at the beginning of each DRX cycle, a configuration parameter set with relatively high power consumption for detecting a candidate PDCCH can facilitate subsequent switching of the configuration parameter set. Alternatively, the third configuration parameter set may be one of N configuration parameter sets or N−1 configuration parameter sets configured by using the at least one first message.

If the third configuration parameter set is one of the N configuration parameter sets or the N−1 configuration parameter sets configured by using the at least one first message, in addition to being used to configure the N configuration parameter sets or the N−1 configuration parameter sets, the at least one first message may be further used to indicate a configuration parameter set, that is, the third configuration parameter set. Alternatively, the third configuration parameter set may not be indicated by using the at least one first message, but is predefined by using a protocol or in another manner, or may be preconfigured by the network device. Alternatively, the third configuration parameter set may be a default configuration parameter set in the N configuration parameter sets or the N−1 configuration parameter sets. For example, the default configuration parameter set is a configuration parameter set that is in the N configuration parameter sets and that is configured by using the at least one first message. Alternatively, the default configuration parameter set is a configuration parameter set that is in the N configuration parameter sets and that is configured by using the at least one second message.

The configuring the third configuration parameter set may be implemented by configuring an index of the third configuration parameter set. For example, indexes may be set for the N configuration parameter sets in a unified manner. In this case, the index of the third configuration parameter set is determined based on the indexes that are set in the unified manner. Alternatively, if the N configuration parameter sets include N−1 configuration parameter sets configured by using the at least one first message and one configuration parameter set configured by using the at least one second message, indexes may be set for the N−1 configuration parameter sets in a unified manner, and an index is separately set for the configuration parameter set configured by using the at least one second message. In this case, the index of the third configuration parameter set is determined based on the indexes that are set for the N−1 configuration parameter sets in a unified manner, or is determined based on the index that is separately set for the configuration parameter set.

In an example, the third configuration parameter set may be a configuration parameter set that is in the N configuration parameter sets and that corresponds to highest power consumption for detecting a candidate PDCCH by the terminal device.

The terminal device automatically enters the third configuration parameter set when the terminal device changes from the state in which a candidate PDCCH is not to be detected to the state in which a candidate PDCCH is to be detected, or in other words, when the terminal device enters, from the slot in which a candidate PDCCH is not to be detected, the slot in which a candidate PDCCH is to be detected, or in other words, in the one or more slots in which the terminal device starts to detect a candidate downlink control channel in the $a^{th}$ DRX cycle. This technical solution may be independently applied, that is, this technical solution is not combined with the foregoing solution of setting the N configuration parameter sets in a nested manner, or the solution of indicating, by using downlink control information or a MAC CE, the terminal device to perform configuration parameter set switching. This technical solution may be applied in combination with the foregoing technical solution. For example, this technical solution may be applied in combination with the solution of setting the N configuration parameter sets in a nested manner, or the solution of indicating, by using a MAC CE, the terminal device to perform configuration parameter set switching; or this technical solution may be applied in combination with the solution of setting the N configuration parameter sets in a nested manner, and the solution of indicating, by using downlink control information, the terminal device to perform configuration parameter set switching. This is not specifically limited.

Figure 4:
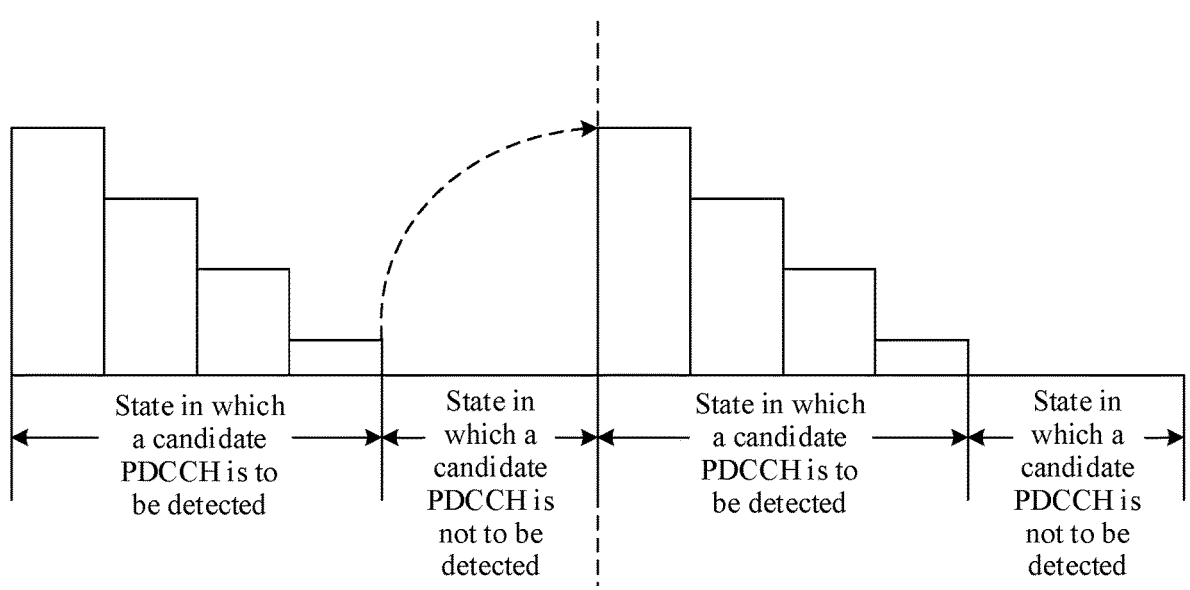
FIG. 4 is a schematic diagram in which a terminal device switches between configuration parameter sets and the terminal device automatically switches to a third configuration parameter set in one or more slots in which the terminal device starts to detect a candidate downlink control channel in an $a^{th}$ discontinuous reception state cycle according to an embodiment of the application.

In the one or more slots in which the terminal device starts to detect a candidate downlink control channel in the $a^{th}$ DRX cycle, the terminal device automatically enters the third configuration parameter set. That this technical solution is applied in combination with the solution of setting the N configuration parameter sets in a nested manner, and the solution of indicating, by using downlink control information, the terminal device to perform configuration parameter set switching is used as an example. Refer to FIG. 4. A block in FIG. 4 represents a configuration parameter set. Different heights of blocks represent different power consumption for detecting a candidate PDCCH by the terminal device corresponding to the configuration parameter sets. A higher height of a block indicates higher power consumption for detecting a candidate PDCCH by the terminal device. It can be learned that, in a state in which a candidate PDCCH is to be detected, the network device indicates the terminal device to switch from a state with high power consumption for detecting a candidate PDCCH to a state with low power consumption for detecting a candidate PDCCH. A vertical dashed line in FIG. 4 represents a boundary between two DRX cycles. In one or more slots in which the terminal device starts to detect a candidate downlink control channel in a next DRX cycle, it can be learned from the dashed line indication of the arc that the terminal device automatically switches to a state with high power consumption for detecting a candidate PDCCH, that is, automatically switches a configuration parameter set, for example, switches to the third configuration parameter set. Certainly, FIG. 4 is merely an example. A switching manner of the terminal device, a relationship of power consumption for detecting a candidate PDCCH by the terminal device corresponding to all the configuration parameter sets, and the like are not limited in an embodiment of the application.

It should be noted that operations S24 and S25 are optional, and are not necessarily performed.

The following describes, with reference to the accompanying drawings, apparatuses configured to implement the foregoing methods in embodiments of the application. Therefore, all the foregoing content may be used in subsequent embodiments, and repeated content is not described again.

Figure 5:
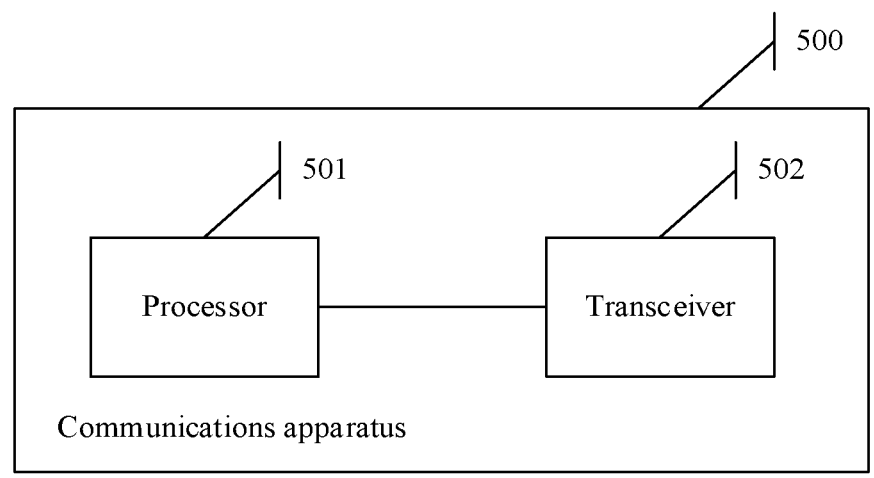
FIG. 5 is a schematic diagram of a communications apparatus that can implement a function of a network device according to an embodiment of the application.

FIG. 5 is a schematic structural diagram of a communications apparatus 500. The communications apparatus 500 may implement functions of the network device described above. The communications apparatus 500 may be the network device described above, or may be a chip disposed in the network device described above. The communications apparatus 500 may include a processor 501 and a transceiver 502. The processor 501 may be configured to perform S21 in the embodiment shown in FIG. 2, and/or configured to support another process of the technology described in this specification. The transceiver 502 may be configured to perform S22 and S24 in the embodiment shown in FIG. 2, and/or configured to support another process of the technology described in this specification.

For example, the processor 501 is configured to determine N configuration parameter sets configured for a terminal device, where each of the N configuration parameter sets includes a parameter for detecting a candidate downlink control channel, and N is an integer greater than or equal to 2.

The transceiver 502 is configured to send information about the N configuration parameter sets to the terminal device, where each of the N configuration parameter sets includes at least one of the following parameters:
a bandwidth part;
a search space parameter;
a candidate downlink control channel detection period;
a control resource set parameter; or a time domain resource set corresponding to the candidate downlink control channel.

All related content of the operations in the foregoing method embodiment may be cited in function descriptions of corresponding function modules, and details are not described herein again.

Figure 6:
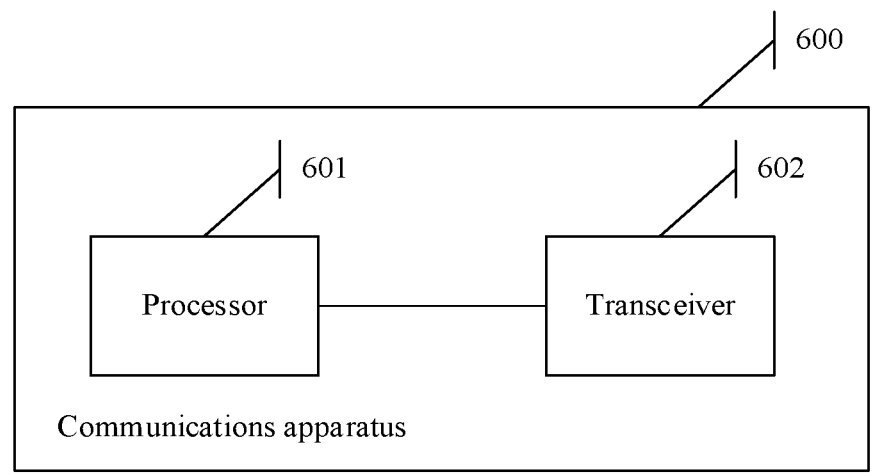
FIG. 6 is a schematic diagram of a communications apparatus that can implement a function of a terminal device according to an embodiment of the application.

FIG. 6 is a schematic structural diagram of a communications apparatus 600. The communications apparatus 600 may implement functions of the terminal device described above. The communications apparatus 600 may be the terminal device described above, or may be a chip disposed in the terminal device described above. The communications apparatus 600 may include a processor 601 and a transceiver 602. The processor 601 may be configured to perform S23 and S25 in the embodiment shown in FIG. 2, and/or configured to support another process of the technology described in this specification. The transceiver 602 may be configured to perform S22 and S24 in the embodiment shown in FIG. 2, and/or configured to support another process of the technology described in this specification.

For example, the transceiver 602 is configured to receive information about N configuration parameter sets.

The processor 601 is configured to determine the N configuration parameter sets based on the information about the N configuration parameter sets, where each of the N configuration parameter sets includes a parameter for detecting a candidate downlink control channel, N is an integer greater than or equal to 2, and each of the N configuration parameter sets includes at least one of the following parameters:
a bandwidth part;
a search space parameter;
a candidate downlink control channel detection period;
a control resource set parameter; or
a time domain resource set corresponding to the candidate downlink control channel.

All related content of the operations in the foregoing method embodiment may be cited in function descriptions of corresponding function modules, and details are not described herein again.

Figure 7A:
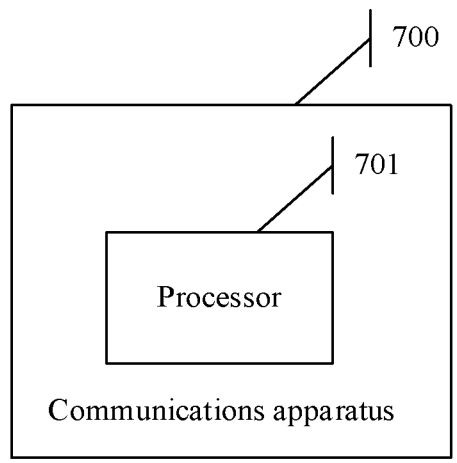
FIG. 7A and FIG. 7B are two schematic diagrams of a communications apparatus according to an embodiment of the application.

In a simple embodiment, one of ordinary skill in the art may figure out that the communications apparatus 500 or the communications apparatus 600 may be further implemented by using a structure of a communications apparatus 700 shown in FIG. 7A. The communications apparatus 700 may implement functions of the terminal device or the network device described above. The communications apparatus 700 may include a processor 701.

When the communications apparatus 700 is configured to implement the functions of the network device described above, the processor 701 may be configured to perform S21 in the embodiment shown in FIG. 2, and/or configured to support another process of the technology described in this specification. Alternatively, when the communications apparatus 700 is configured to implement the functions of the terminal device described above, the processor 701 may be configured to perform S23 and S25 in the embodiment shown in FIG. 2, and/or configured to support another process of the technology described in this specification.

The communications apparatus 700 may be a field-programmable gate array (FPGA), an application-specific integrated chip (ASIC), a system-on-a-chip (SoC), a central processing unit (CPU), a network processor (NP), a digital signal processing circuit (DSP), a micro controller (e.g., micro controller unit, MCU), a programmable controller (e.g., programmable logic device, PLD), or another integrated chip. In this case, the communications apparatus 700 may be disposed in the terminal device or the network device in embodiments of the application, so that the first network device or the second network device implements the method provided in embodiments of the application.

In an optional implementation, the communications apparatus 700 may include a transceiver component, configured to communicate with another device. When the communications apparatus 700 is configured to implement functions of the network device or the terminal device described above, the transceiver component may be configured to perform S22 and S24 in the embodiment shown in FIG. 2, and/or configured to support another process of the technology described in this specification. For example, when the transceiver component is a communications interface, if the communications apparatus 700 is the network device or the terminal device, the communications interface may be a transceiver in the network device or the terminal device, such as the transceiver 502 or the transceiver 602, and the transceiver is, for example, a radio frequency transceiver component in the network device or the terminal device; or if the communications apparatus 700 is a chip disposed in the network device or the terminal device, the communications interface may be an input/output interface of the chip, such as an input/output pin.

Figure 7B:
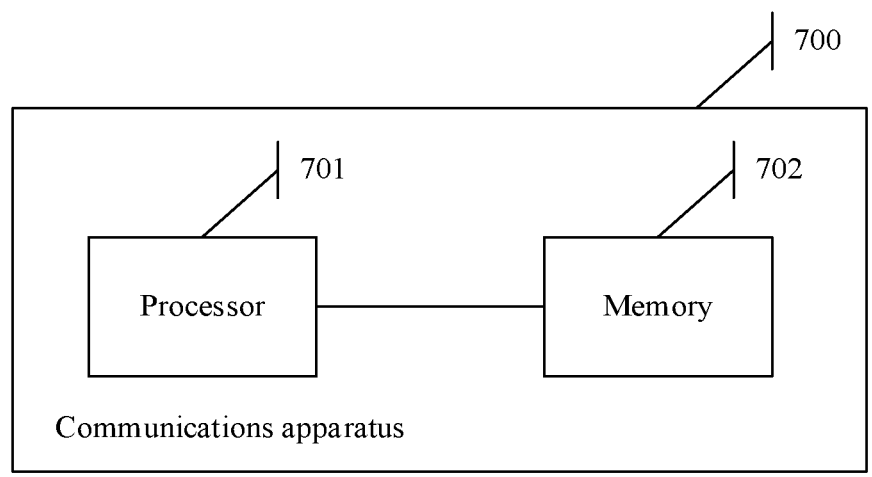

In an optional implementation, the communications apparatus 700 may further include a memory 702. Referring to FIG. 7B, the memory 702 is configured to store computer programs or instructions, and the processor 701 is configured to decode and execute the computer programs or the instructions. It should be understood that these computer programs or instructions may include function programs of the network device or the terminal device. When the function programs of the network device are decoded and executed by the processor 701, the network device is enabled to implement the functions of the network device in the method provided in the embodiment shown in FIG. 2 in embodiments of the application. When the function programs of the terminal device are decoded and executed by the processor 701, the terminal device is enabled to implement the functions of the terminal device in the method provided in the embodiment shown in FIG. 2 in embodiments of the application.

In another optional implementation, the function programs of the network device or the terminal device are stored in an external memory of the communications apparatus 700. When the function programs of the network device are decoded and executed by the processor 701, the memory 702 temporarily stores some or all of the function programs of the network device. When the function programs of the terminal device are decoded and executed by the processor 701, the memory 702 temporarily stores some or all of the function programs of the terminal device.

In another optional implementation, the function programs of the terminal device or the network device are stored in the memory 702 inside the communications apparatus 700. When the function programs of the network device are stored in the memory 702 inside the communications apparatus 700, the communications apparatus 700 may be disposed in the network device in embodiments of the application. When the function programs of the terminal device are stored in the memory 702 inside the communications apparatus 700, the communications apparatus 700 may be disposed in the terminal device in embodiments of the application.

In still another optional implementation, some of the function programs of the network device are stored in the external memory of the communications apparatus 700, and the other function programs of the network device are stored in the memory 702 inside the communications apparatus 700. Alternatively, some of the function programs of the terminal device are stored in the external memory of the communications apparatus 700, and the other function programs of the terminal device are stored in the memory 702 inside the communications apparatus 700.

In embodiments of the application, the communications apparatus 500, the communications apparatus 600, and the communications apparatus 700 are presented in a form in which function modules are obtained through division based on corresponding functions, or may be presented in a form in which function modules are obtained through division in an integrated manner. The "module" herein may be an ASIC, a processor and a memory that execute one or more software or firmware programs, an integrated logic circuit, and/or another component that can provide the foregoing functions.

In addition, the communications apparatus 500 provided in the embodiment shown in FIG. 5 may alternatively be implemented in another form. For example, the communications apparatus includes a processing module and a transceiver module. For example, the processing module may be implemented by using the processor 501, and the transceiver module may be implemented by using the transceiver 502. The processing module may be configured to perform S21 in the embodiment shown in FIG. 2, and/or configured to support another process of the technology described in this specification. The transceiver module may be configured to perform S22 and S24 in the embodiment shown in FIG. 2, and/or configured to support another process of the technology described in this specification.

For example, the processing module is configured to determine N configuration parameter sets configured for a terminal device, where each of the N configuration parameter sets includes a parameter for detecting a candidate downlink control channel, and N is an integer greater than or equal to 2.

The transceiver module is configured to send information about the N configuration parameter sets to the terminal device, where each of the N configuration parameter sets includes at least one of the following parameters:
a bandwidth part;
a search space parameter;
a candidate downlink control channel detection period;
a control resource set parameter; or
a time domain resource set corresponding to the candidate downlink control channel.

All related content of the operations in the foregoing method embodiment may be cited in function descriptions of corresponding function modules, and details are not described herein again.

The communications apparatus 600 provided in the embodiment shown in FIG. 6 may alternatively be implemented in another form. For example, the communications apparatus includes a processing module and a transceiver module. For example, the processing module may be implemented by using the processor 601, and the transceiver module may be implemented by using the transceiver 602. The processing module may be configured to perform S23 and S25 in the embodiment shown in FIG. 2, and/or configured to support another process of the technology described in this specification. The transceiver module may be configured to perform S22 and S24 in the embodiment shown in FIG. 2, and/or configured to support another process of the technology described in this specification.

For example, the transceiver module is configured to receive information about N configuration parameter sets.

The processing module is configured to determine the N configuration parameter sets based on the information about the N configuration parameter sets, where each of the N configuration parameter sets includes a parameter for detecting a candidate downlink control channel, N is an integer greater than or equal to 2, and each of the N configuration parameter sets includes at least one of the following parameters:

a bandwidth part;
  a search space parameter;
  a candidate downlink control channel detection period;
  a control resource set parameter; or
  a time domain resource set corresponding to the candidate downlink control channel.

All related content of the operations in the foregoing method embodiment may be cited in function descriptions of corresponding function modules, and details are not described herein again.

The communications apparatus 500, the communications apparatus 600, and the communications apparatus 700 provided in embodiments of the application may be configured to perform the method provided in the embodiment shown in FIG. 2. Therefore, for technical effects that can be achieved by the communications apparatus 500, the communications apparatus 600, and the communications apparatus 700, refer to the foregoing method embodiments, and details are not described herein again.

Embodiments of the application are described with reference to the flowcharts and/or block diagrams of the method, the device (system), and the computer program product according to embodiments of the application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a special-purpose computer, an embedded processor, or another programmable data processing device to generate a machine, so that an instruction that is executed by a processor of a computer or another programmable data processing device generates an apparatus configured to implement a function in one or more processes in the flowcharts and/or in one or more blocks in the block diagrams.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some of the procedures or functions according to embodiments of the application are generated. The computer may be a general-purpose computer, a special-purpose computer, a computer network, or another programmable apparatus. The computer instructions may be stored in a computer-readable storage medium or transmitted from one computer-readable storage medium to another readable storage medium. For example, the computer instructions may be transmitted from a website, computer, server, or data center to another website, computer, server, or data center by using a wired (for example, a coaxial cable, an optical fiber, or a digital subscriber line (DSL)) or wireless (such as infrared, wireless, and microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconducting medium (for example, a solid-state drive (solid state disk, SSD)), or the like.

Obviously, one of ordinary skill in the art can make various modifications and variations to embodiments of the application without departing from the spirit and scope of the application. In this way, the application is intended to cover these modifications and variations of embodiments of the application provided that they fall within the scope of protection defined by the following claims and their equivalent technologies.

What is claimed is:

1. A communication method, comprising:
  determining N configuration parameter sets for a terminal device, wherein each of the N configuration parameter sets comprises a parameter for detecting a candidate downlink control channel, and N is an integer greater than or equal to 2;
  sending information about the N configuration parameter sets to the terminal device, wherein each of the N configuration parameter sets comprises a parameter of a time domain resource set of the candidate downlink control channel, and wherein a candidate downlink control channel resource corresponding to an $i^{th}$ configuration parameter set in the N configuration parameter sets is a subset of the candidate downlink control channel resource corresponding to an $(i-1)^{th}$ configuration parameter set comprises at least one of the following:
    each of the N configuration parameter sets comprises a candidate downlink control channel detection period, the candidate downlink control channel detection period comprised in the $i^{th}$ configuration parameter set is greater than the candidate downlink control channel detection period comprised in the $(i-1)^{th}$ configuration parameter set, and the candidate downlink control channel detection period comprised in the $i^{th}$ configuration parameter set is an integer multiple of the candidate downlink control channel detection period comprised in the $(i-1)^{th}$ configuration parameter set;
    each of the N configuration parameter sets comprises a control resource set parameter, and a control resource set of the candidate downlink control channel corresponding to the $i^{th}$ configuration parameter set is a subset of the control resource set of the candidate downlink control channel corresponding to the $(i-1)^{th}$ configuration parameter set;
    each of the N configuration parameter sets comprises a bandwidth part, and a search space of the candidate downlink control channel corresponding to the bandwidth part corresponding to the $i^{th}$ configuration parameter set is a subset of the search space of the candidate downlink control channel corresponding to the bandwidth part corresponding to the $(i-1)^{th}$ configuration parameter set; or
    each of the N configuration parameter sets comprises the bandwidth part, and the control resource set of the candidate downlink control channel corresponding to the bandwidth part corresponding to the $i^{th}$ configuration parameter set is a subset of the control resource set of the candidate downlink control channel corresponding to the bandwidth part corresponding to the $(i-1)^{th}$ configuration parameter set; and sending second downlink control information to a terminal device group, wherein the second downlink control information comprises at least one piece of indication information, and each of the at least one piece of indication information is used to indicate a configuration parameter set in the N configuration parameter sets for one or more terminal devices in the terminal device group.

2. The method according to claim 1, further comprising:
in response to the terminal device entering, from a slot in which the candidate downlink control channel is not to be detected, a slot in which the candidate downlink control channel is to be detected, or in one or more slots in which the terminal device starts to detect the candidate downlink control channel in an $a^{th}$ discontinuous reception state cycle, sending a downlink control channel to the terminal device on a candidate downlink control channel resource corresponding to a third configuration parameter set, wherein the third configuration parameter set is in the N configuration parameter sets.

3. The method according to claim 2, wherein the sending information about the N configuration parameter sets to the terminal device comprises:

sending at least one first message to the terminal device, wherein the at least one first message is used to indicate the N configuration parameter sets; and sending at least one second message to the terminal device, wherein the at least one second message is used to indicate one configuration parameter set from the N configuration parameter sets, and the third configuration parameter set is from the N configuration parameter sets or the third configuration parameter set is the one configuration parameter set; or sending at least one first message to the terminal device, wherein the at least one first message is used to indicate (N−1) configuration parameter sets in the N configuration parameter sets; and sending at least one second message to the terminal device, wherein the at least one second message is used to indicate one remaining configuration parameter set other than the (N−1) configuration parameter sets in the N configuration parameter sets, and the third configuration parameter set is one of the (N−1) configuration parameter sets or the one remaining configuration parameter set is the one configuration parameter set; or sending at least one first message to the terminal device, wherein the at least one first message is used to indicate the N configuration parameter sets, and the third configuration parameter set is one of the N configuration parameter sets.

4. The method according to claim 1, further comprising:
sending first downlink control information to the terminal device, wherein the first downlink control information is used to indicate a first configuration parameter set in the N configuration parameter sets, a candidate downlink control channel resource corresponding to the first configuration parameter set is a subset of the candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle.

5. A communication method, comprising:
receiving information about N configuration parameter sets at a terminal device;

determining the N configuration parameter sets based on the information about the N configuration parameter sets, wherein each of the N configuration parameter sets comprises a parameter for detecting a candidate downlink control channel, N is an integer greater than or equal to 2, and each of the N configuration parameter sets comprises a parameter of a time domain resource set of the candidate downlink control channel, and wherein a candidate downlink control channel resource corresponding to an $i^{th}$ configuration parameter set in the N configuration parameter sets is a subset of the candidate downlink control channel resource corresponding to an $(i-1)^{th}$ configuration parameter set comprises at least one of the following:

each of the N configuration parameter sets comprises a candidate downlink control channel detection period, the candidate downlink control channel detection period comprised in the $i^{th}$ configuration parameter set is greater than the candidate downlink control channel detection period comprised in the $(i-1)^{th}$ configuration parameter set, and the candidate downlink control channel detection period comprised in the $i^{th}$ configuration parameter set is an integer multiple of the candidate downlink control channel detection period comprised in the $(i-1)^{th}$ configuration parameter set;

each of the N configuration parameter sets comprises a control resource set parameter, and a control resource set of the candidate downlink control channel corresponding to the $i^{th}$ configuration parameter set is a subset of the control resource set of the candidate downlink control channel corresponding to the $(i-1)^{th}$ configuration parameter set;

each of the N configuration parameter sets comprises a bandwidth part, and a search space of the candidate downlink control channel corresponding to the bandwidth part corresponding to the $i^{th}$ configuration parameter set is a subset of the search space of the candidate downlink control channel corresponding to the bandwidth part corresponding to the $(i-1)^{th}$ configuration parameter set; or each of the N configuration parameter sets comprises the bandwidth part, and the control resource set of the candidate downlink control channel corresponding to the bandwidth part corresponding to the $i^{th}$ configuration parameter set is a subset of the control resource set of the candidate downlink control channel corresponding to the bandwidth part corresponding to the $(i-1)^{th}$ configuration parameter set; and detecting second downlink control information to a terminal device group, wherein the second downlink control information comprises at least one piece of indication information, and each of the at least one piece of indication information is used to indicate a configuration parameter set in the N configuration parameter sets for one or more terminal devices in the terminal device group.

6. The method according to claim 5, further comprising:
in response to the terminal device entering, from a slot in which the candidate downlink control channel is not to be detected, a slot in which the candidate downlink control channel is to be detected, or in one or more slots in which the terminal device starts to detect the candidate downlink control channel in an $a^{th}$ discontinuous reception state cycle,
detecting the candidate downlink control channel on a resource of the candidate downlink control channel corresponding to a third configuration parameter set, wherein the third configuration parameter set is in the N configuration parameter sets.

7. The method according to claim 6, wherein the receiving information about the N configuration parameter sets comprises:
receiving at least one first message, wherein the at least one first message is used to indicate the N configuration parameter sets; and receiving at least one second message, wherein the at least one second message is used to indicate one configuration parameter set from the N configuration parameter sets, and the third configuration parameter set is from the N configuration parameter sets or the third configuration parameter set is the one configuration parameter set; or
receiving at least one first message, wherein the at least one first message is used to indicate (N−1) configuration parameter sets in the N configuration parameter sets; and receiving at least one second message, wherein the at least one second message is used to indicate one remaining configuration parameter set other than the (N−1) configuration parameter sets in the N configuration parameter sets, and the third configuration parameter set is one of the (N−1) configuration parameter sets or the third configuration parameter set is the one remaining configuration parameter set; or
receiving at least one first message, wherein the at least one first message is used to indicate the N configuration parameter sets, and the third configuration parameter set is one of the N configuration parameter sets.

8. The method according to claim 5, wherein the method further comprises:
receiving first downlink control information, wherein the first downlink control information is used to indicate a first configuration parameter set in the N configuration parameter sets, a candidate downlink control channel resource corresponding to the first configuration parameter set is a subset of a candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle.

9. The method according to claim 5, wherein, when the candidate downlink control channel resource corresponding to the $i^{th}$ configuration parameter set in the N configuration parameter sets is the subset of the candidate downlink control channel resource corresponding to the $(i-1)^{th}$ configuration parameter set, i is an integer greater than or equal to 1 and less than or equal to N.

10. A network device, comprising:
a processor configured to determine N configuration parameter sets for a terminal device, wherein each of the N configuration parameter sets comprises a parameter for detecting a candidate downlink control channel, and N is an integer greater than or equal to 2; and
a transceiver configured to:
send information about the N configuration parameter sets to the terminal device, wherein each of the N configuration parameter sets comprises a parameter of a time domain resource set of the candidate downlink control channel, and wherein a candidate downlink control channel resource corresponding to an $i^{th}$ configuration parameter set in the N configuration parameter sets is a subset of the candidate downlink control channel resource corresponding to an $(i-1)^{th}$ configuration parameter set comprises at least one of the following:
each of the N configuration parameter sets comprises a candidate downlink control channel detection period, the candidate downlink control channel detection period comprised in the $i^{th}$ configuration parameter set is greater than the candidate downlink control channel detection period comprised in the $(i-1)^{th}$ configuration parameter set, and the candidate downlink control channel detection period comprised in the $i^{th}$ configuration parameter set is an integer multiple of the candidate downlink control channel detection period comprised in the $(i-1)^{th}$ configuration parameter set;
each of the N configuration parameter sets comprises a control resource set parameter, and a control resource set of the candidate downlink control channel corresponding to the $i^{th}$ configuration parameter set is a subset of the control resource set of the candidate downlink control channel corresponding to the $(i-1)^{th}$ configuration parameter set;
each of the N configuration parameter sets comprises a bandwidth part, and a search space of the candidate downlink control channel corresponding to the bandwidth part corresponding to the $i^{th}$ configuration parameter set is a subset of the search space of the candidate downlink control channel corresponding to the bandwidth part corresponding to the $(i-1)^{th}$ configuration parameter set; or
each of the N configuration parameter sets comprises the bandwidth part, and the control resource set of the candidate downlink control channel corresponding to the bandwidth part corresponding to the $i^{th}$ configuration parameter set is a subset of the control resource set of the candidate downlink control channel corresponding to the bandwidth part corresponding to the $(i-1)^{th}$ configuration parameter set; and
send second downlink control information to a terminal device group, wherein the second downlink control information comprises at least one piece of indication information, and each of the at least one piece of indication information is used to indicate a configuration parameter set in the N configuration parameter sets for one or more terminal devices in the terminal device group.

11. The network device according to claim 10, wherein the transceiver is further configured to:
in response to the terminal device entering, from a slot in which the candidate downlink control channel is not to be detected, a slot in which the candidate downlink control channel is to be detected, or in one or more slots in which the terminal device starts to detect the candidate downlink control channel in an $a^{th}$ discontinuous reception state cycle, send a downlink control channel to the terminal device on a candidate downlink control channel resource corresponding to a third configuration parameter set, wherein the third configuration parameter set is in the N configuration parameter sets.

12. The network device according to claim 11, wherein the transceiver is configured to send the information about the N configuration parameter sets to the terminal device in the following manners:
   sending at least one first message to the terminal device, wherein the at least one first message is used to indicate the N configuration parameter sets; and sending at least one second message to the terminal device, wherein the at least one second message is used to indicate one configuration parameter set from the N configuration parameter sets, and the third configuration parameter set is from the N configuration parameter sets or the third configuration parameter set is the one configuration parameter set; or
   sending at least one first message to the terminal device, wherein the at least one first message is used to indicate (N−1) configuration parameter sets in the N configuration parameter sets; and sending at least one second message to the terminal device, wherein the at least one second message is used to indicate one remaining configuration parameter set other than the (N−1) configuration parameter sets in the N configuration parameter sets, and the third configuration parameter set is one of the (N−1) configuration parameter sets or the third configuration parameter set is the one remaining configuration parameter set; or
   sending at least one first message to the terminal device, wherein the at least one first message is used to indicate the N configuration parameter sets, and the third configuration parameter set is one of the N configuration parameter sets.

13. The network device according to claim 10, wherein the transceiver is further configured to:
   send first downlink control information to the terminal device, wherein the first downlink control information is used to indicate a first configuration parameter set in the N configuration parameter sets, a candidate downlink control channel resource corresponding to the first configuration parameter set is a subset of the candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle.

14. An apparatus, comprising:
   a transceiver configured to receive information about N configuration parameter sets;
   a processor configured to determine the N configuration parameter sets based on the information about the N configuration parameter sets, wherein each of the N configuration parameter sets comprises a parameter for detecting a candidate downlink control channel, N is an integer greater than or equal to 2, and each of the N configuration parameter sets comprises a parameter of a time domain resource set of the candidate downlink control channel, and wherein a candidate downlink control channel resource corresponding to an $i^{th}$ configuration parameter set in the N configuration parameter sets is a subset of the candidate downlink control channel resource corresponding to an $(i-1)^{th}$ configuration parameter set comprises at least one of the following:
      each of the N configuration parameter sets comprises a candidate downlink control channel detection period, the candidate downlink control channel detection period comprised in the $i^{th}$ configuration parameter set is greater than the candidate downlink control channel detection period comprised in the $(i-1)^{th}$ configuration parameter set, and the candidate downlink control channel detection period comprised in the $i^{th}$ configuration parameter set is an integer multiple of the candidate downlink control channel detection period comprised in the $(i-1)^{th}$ configuration parameter set;
      each of the N configuration parameter sets comprises a control resource set parameter, and a control resource set of the candidate downlink control channel corresponding to the $i^{th}$ configuration parameter set is a subset of the control resource set of the candidate downlink control channel corresponding to the $(i-1)^{th}$ configuration parameter set;
      each of the N configuration parameter sets comprises a bandwidth part, and a search space of the candidate downlink control channel corresponding to the bandwidth part corresponding to the $i^{th}$ configuration parameter set is a subset of the search space of the candidate downlink control channel corresponding to the bandwidth part corresponding to the $(i-1)^{th}$ configuration parameter set; or
      each of the N configuration parameter sets comprises the bandwidth part, and the control resource set of the candidate downlink control channel corresponding to the bandwidth part corresponding to the $i^{th}$ configuration parameter set is a subset of the control resource set of the candidate downlink control channel corresponding to the bandwidth part corresponding to the $(i-1)^{th}$ configuration parameter set; and
   the transceiver further configured to detect second downlink control information to a terminal device group, wherein the second downlink control information comprises at least one piece of indication information, and each of the at least one piece of indication information is used to indicate a configuration parameter set in the N configuration parameter sets for one or more terminal devices in the terminal device group.

15. The apparatus according to claim 14, wherein the transceiver is further configured to:
   in response to the terminal device entering, from a slot in which the candidate downlink control channel is not to be detected, a slot in which the candidate downlink control channel is to be detected, or in one or more slots in which the terminal device starts to detect the candidate downlink control channel in an $a^{th}$ discontinuous reception state cycle,
   detect the candidate downlink control channel corresponding to a third configuration parameter set on a resource of the candidate downlink control channel, wherein the third configuration parameter set is in the N configuration parameter sets.

16. The apparatus according to claim 15, wherein the transceiver is configured to receive the information about the N configuration parameter sets in the following manners:
   receiving at least one first message, wherein the at least one first message is used to indicate the N configuration parameter sets; and receiving at least one second message, wherein the at least one second message is used to indicate one configuration parameter set from the N configuration parameter sets, and the third configuration parameter set is from the N configuration parameter sets or the third configuration parameter set is the one configuration parameter set; or receiving at least one first message, wherein the at least one first message is used to indicate (N−1) configuration parameter sets in the N configuration parameter sets; and receiving at least one second message, wherein the at least one second message is used to indicate one remaining configuration parameter set other than the (N−1) configuration parameter sets in the N configuration parameter sets, and the third configuration parameter set is one of the (N−1) configuration parameter sets or the third configuration parameter set is the one remaining configuration parameter set; or receiving at least one first message, wherein the at least one first message is used to indicate the N configuration parameter sets, and the third configuration parameter set is one of the N configuration parameter sets.

17. The apparatus according to claim 14, wherein the transceiver is further configured to:

receive first downlink control information, wherein the first downlink control information is used to indicate a first configuration parameter set in the N configuration parameter sets, a candidate downlink control channel resource corresponding to the first configuration parameter set is a subset of a candidate downlink control channel resource corresponding to a second configuration parameter set in the N configuration parameter sets, the second configuration parameter set is a configuration parameter set used when the terminal device detects the first downlink control information, and the first configuration parameter set and the second configuration parameter set are configuration parameter sets used by the terminal device in a same discontinuous reception cycle.

18. The apparatus according to claim 14, wherein, when the candidate downlink control channel resource corresponding to the $i^{th}$ configuration parameter set in the N configuration parameter sets is the subset of the candidate downlink control channel resource corresponding to the $(i-1)^{th}$ configuration parameter set, i is an integer greater than or equal to 1 and less than or equal to N.

* * * * *